United States Patent
Quayle et al.

(10) Patent No.: US 8,756,127 B2
(45) Date of Patent: Jun. 17, 2014

(54) POOL-BASED SYSTEM FOR ORGANIZING AND MEASURING PERSONALIZED FINANCIAL MANAGEMENT TECHNIQUES

(75) Inventors: Dirk Allan Quayle, Northbrook, IL (US); Jon Christopher Hagen, Chicago, IL (US)

(73) Assignee: Nextcapital Group, Inc., Chicago, IL (US)

(*) Notice: Subject to any disclaimer, the term of this patent is extended or adjusted under 35 U.S.C. 154(b) by 2259 days.

(21) Appl. No.: 11/342,509

(22) Filed: Jan. 30, 2006

(65) Prior Publication Data

US 2007/0192224 A1 Aug. 16, 2007

(51) Int. Cl.
G06Q 40/00 (2012.01)

(52) U.S. Cl.
CPC .................................. G06Q 40/00 (2013.01)
USPC .............................. 705/35; 705/36 R; 705/37

(58) Field of Classification Search
USPC ....................................................... 705/35–37
See application file for complete search history.

(56) References Cited

U.S. PATENT DOCUMENTS

| | | | | |
|---|---|---|---|---|
| 3,983,535 A * | 9/1976 | Herbst et al. | 382/122 |
| 5,555,364 A * | 9/1996 | Goldstein | 715/797 |
| 5,930,774 A * | 7/1999 | Chennault | 705/36 R |
| 6,006,209 A * | 12/1999 | Takeuchi et al. | 705/40 |
| 6,021,397 A * | 2/2000 | Jones et al. | 705/36 R |
| 7,031,935 B1 * | 4/2006 | Chhabra et al. | 705/36 T |
| 7,228,289 B2 * | 6/2007 | Brumfield et al. | 705/35 |
| 7,363,263 B1 * | 4/2008 | Magaram et al. | 705/35 |
| 7,454,380 B2 * | 11/2008 | Garahi et al. | 705/37 |
| 8,521,644 B1 * | 8/2013 | Hanson et al. | 705/38 |
| 2002/0103733 A1 * | 8/2002 | Barrington et al. | 705/35 |
| 2003/0126054 A1 * | 7/2003 | Purcell, Jr. | 705/36 |
| 2006/0010053 A1 * | 1/2006 | Farrow | 705/35 |
| 2006/0178963 A1 * | 8/2006 | Masuyama | 705/35 |
| 2006/0190372 A1 * | 8/2006 | Chhabra et al. | 705/35 |
| 2006/0212381 A1 * | 9/2006 | Rowe, III | 705/37 |
| 2007/0176006 A1 * | 8/2007 | Saunders | 235/487 |
| 2007/0192224 A1 * | 8/2007 | Quayle et al. | 705/36 R |
| 2007/0214076 A1 * | 9/2007 | Robida et al. | 705/38 |
| 2007/0244837 A1 * | 10/2007 | Plow et al. | 705/36 R |
| 2007/0271196 A1 * | 11/2007 | Blitzer et al. | 705/36 R |

* cited by examiner

*Primary Examiner* — Gregory Johnson
(74) *Attorney, Agent, or Firm* — Arnstein & Lehr LLP

(57) ABSTRACT

A system and method for a money pools system is presented. The money pools system includes a plurality of financial positions that are allocated to a plurality of pools. A category may be used to contain a grouping of pools. Multiple categories allow a user to view aggregated financial positions that are common to the multiple categories. New pools and categories may be created by a user, a financial institution, and/or a third party. Pool systems may also incorporate pool templates to facilitate the creation of pools. Pool templates may also be shared over a network of interconnected money pool systems.

57 Claims, 30 Drawing Sheets

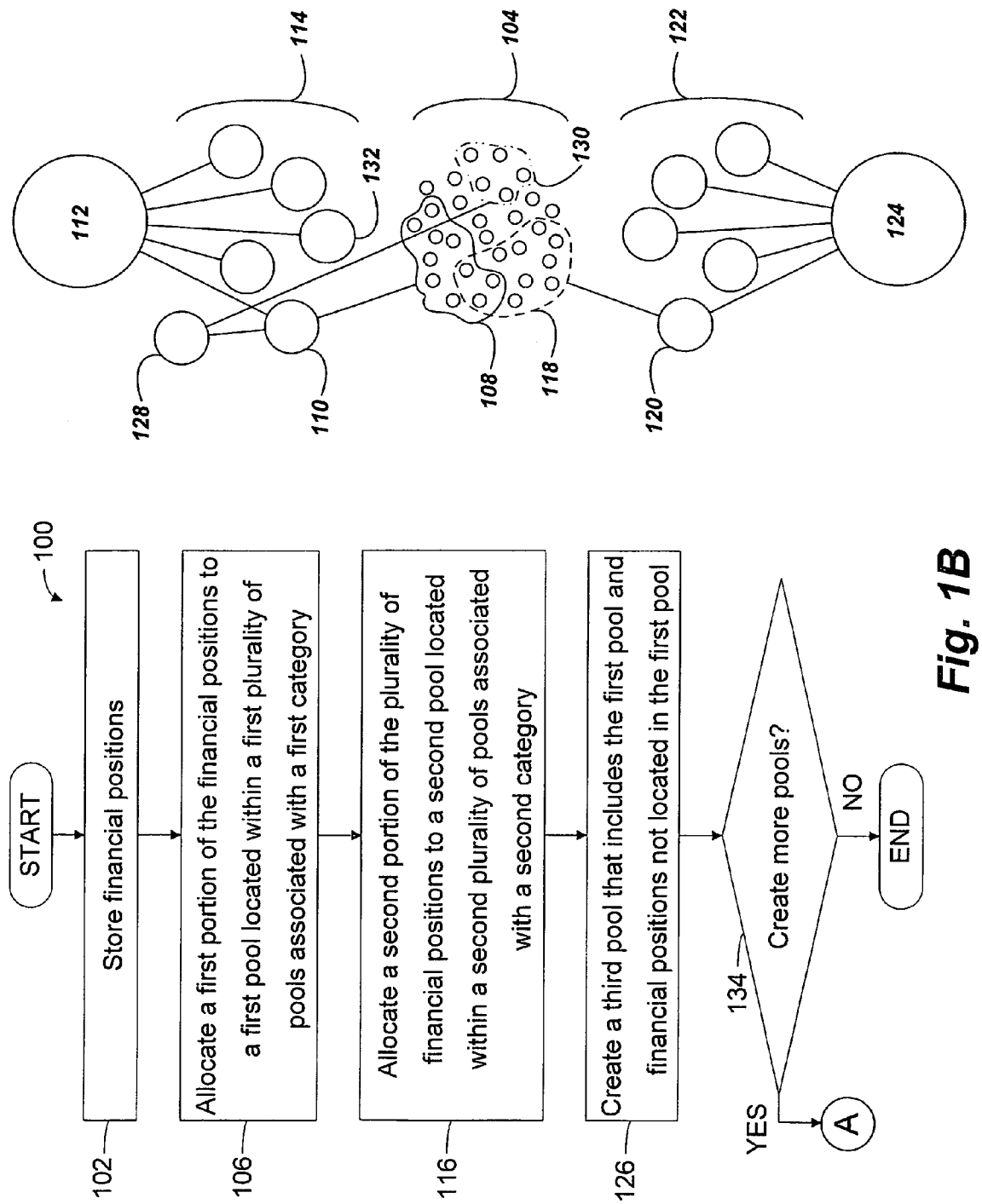

FIG. 4A

Traditional Portfolio View

Account #844

| Positions | Shares | Price | Value | Cost | Gain/Loss | |
|---|---|---|---|---|---|---|
| OAKLX | 564.8 | 33.2 | $18,751 | $17,000 | $1,751 | Trade Chart |
| PRBLX | 761 | 24.6 | $18,764 | $16,000 | $2,764 | Trade Chart |
| PASDX | 1160 | 13.01 | $15,092 | $15,000 | $92 | Trade Chart |
| CVTRX | 558 | 29.53 | $16,478 | $16,000 | $478 | Trade Chart |

Money Pool View

FIG. 4D

MoneyPool

Define a Goal.

Money Pools
Accounts
- #844
- #845
- #846
- #222
- #223

Life Goals
- Goal Summary
- Retirement
- 2nd Home
- Create a Goal

Map It - Goals | Above Target | Near Target | Off Target | No Target

| Retirement | 2nd Home | College | Create Custom |
| Not Defined | Not Defined | Not Defined | Not Defined |
| No positions | No positions | No positions | No positions |
| Assigned | Assigned | Assigned | Assigned |

Define the life goal you selected below and we will begin tracking your progress today.

1. Goal you selected — College
2. Year you need $ — 2018
3. Annual $ Amount needed — $40,000
4. For how many years? — 4

Next

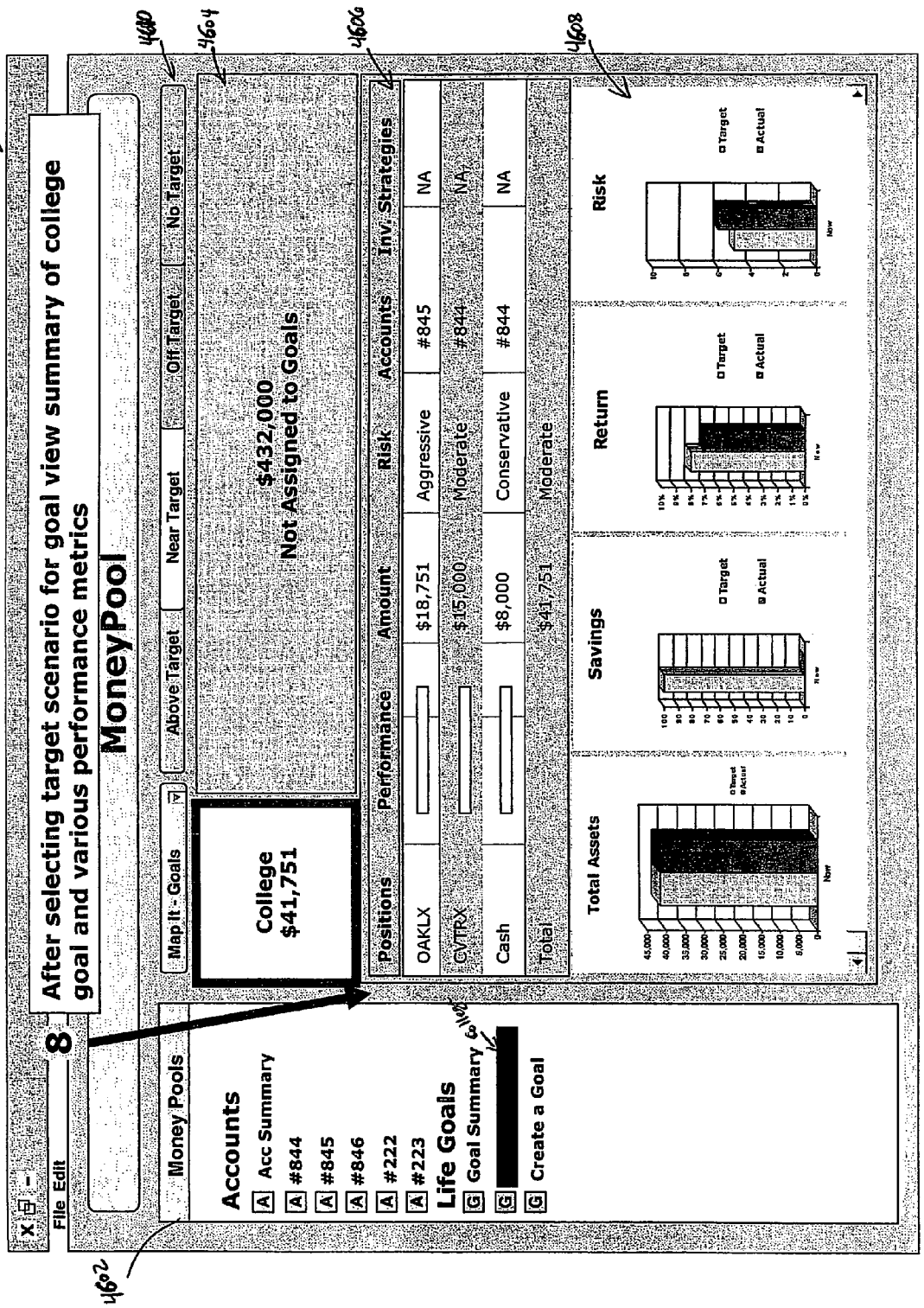

| CLIENT - # ACCOUNTS (502) | NUMBER OF CLIENTS (504) | ASSETS (506) | % ACCOUNTS USING TACTICAL POOLS (508) | # USING PURPOSE POOLS (510) | $ IN PURPOSE POOLS (512) | # USING TACTICAL AND PURPOSE POOLS (514) |
|---|---|---|---|---|---|---|
| 1 | 400,000 | 10,000,000,000 | | | | |
| 2 | 400,000 | 14,000,000,000 | | | | |
| 3 | 340,000 | 15,300,000,000 | | | | |
| 4 | 300,000 | 15,000,000,000 | | | | |
| 5 | 150,000 | 7,500,000,000 | | | | |
| 6 | 100,000 | 5,000,000,000 | | | | |
| 7 | 70,000 | 3,500,000,000 | | | | |
| 8 | 18,000 | 900,000,000 | | | | |
| 9 | 3,000 | 150,000,000 | | | | |
| 10 | 1,000 | 50,000,000 | | | | |
| | | 71,400,000 | | | | |

*Fig. 5A*

TOP TACTICAL POOLS

| CLIENT # ACCTS (502) | NUMBER OF CLIENTS (504) | ASSETS (506) | INSTITUTION 201 SELECT EQUITY (518) | INSTITUTION 201 MATURITY 15 RISK 75 (520) | INSTITUTION 201 MATURITY 20 RISK 100 (522) | THIRD PARTY ADVISOR (524) | INSTITUTION 202 EQUITY FUNDS (526) | CLIENT HIGH DIV (528) |
|---|---|---|---|---|---|---|---|---|
| 1 | 400,000 | 10,000,000,000 | 230,000,000 | 80,000,000 | 60,000,000 | 30,000,000 | 10,000,000 | 8,000,000 |
| 2 | 400,000 | 14,000,000,000 | 322,000,000 | 112,000,000 | 84,000,000 | 42,000,000 | 14,000,000 | 11,200,000 |
| 3 | 340,000 | 15,300,000,000 | 351,900,000 | 122,400,000 | 91,800,000 | 45,900,000 | 15,300,000 | 12,240,000 |
| 4 | 300,000 | 15,000,000,000 | 345,000,000 | 120,000,000 | 90,000,000 | 45,000,000 | 15,000,000 | 12,000,000 |
| 5 | 150,000 | 7,500,000,000 | 172,500,000 | 60,000,000 | 45,000,000 | 22,500,000 | 7,500,000 | 6,000,000 |
| 6 | 100,000 | 5,000,000,000 | 115,000,000 | 40,000,000 | 30,000,000 | 15,000,000 | 5,000,000 | 4,000,000 |
| 7 | 70,000 | 3,500,000,000 | 80,500,00 | 28,000,000 | 21,000,000 | 10,500,000 | 3,500,000 | 2,800,000 |
| 8 | 18,000 | 900,000,000 | 20,700,000 | 7,200,000 | 5,400,000 | 2,700,000 | 900,000 | 720,000 |
| 9 | 3,000 | 150,000,000 | 3,450,000 | 1,200,000 | 900,000 | 450,000 | 150,000 | 120,000 |
| 10 | 1,000 | 50,000,000 | 1,150,000 | 400,000 | 300,000 | 150,000 | 50,000 | 40,000 |
|  |  | 71,400,000 |  | 571,200,000 | 428,400,000 |  |  |  |

*Fig. 5B*

| NAME | RISK | RISK ADJUSTED TARGET | ACTUAL RETURN | CLIENT ASSETS |
|---|---|---|---|---|
| INSTITUTION 201 TARGET MATURITY 15 RISK 75 | 80 | 7% | 11% | 571,200,000 |
| INSTITUTION 201 TARGET MATURITY 25 RISK 125 | 135 | 9% | 13% | 125,000,000 |
| INSTITUTION 201 TARGET MATURITY 5 RISK 50 | 48 | 5% | 5.55% | 130,000,000 |
| INSTITUTION 201 TARGET MATURITY 20 RISK 100 | 95 | 8.50% | 11.50% | 428,400,000 |
| INSTITUTION 201 TARGET MATURITY 15 RISK 125 | 125 | 8.75% | 9% | 100,000,000 |
| INSTITUTION 201 TARGET MATURITY 5 RISK 100 | 100 | 6% | 5.40% | 50,000,000 |
| INSTITUTION 201 TARGET MATURITY 10 RISK 125 | 125 | 8% | 7% | 10,000,000 |
| INSTITUTION 201 TARGET MATURITY 10 RISK 100 | 100 | 7% | 6% | 12,000,000 |

POOL-BASED SYSTEM FOR ORGANIZING AND MEASURING PERSONALIZED FINANCIAL MANAGEMENT TECHNIQUES

BACKGROUND

The present invention relates in general to financial planning, and more particularly, without limitation, to a computerized system and method for creating, organizing, managing, and/or tracking pool-based views of financial positions.

As a person earns an income and progresses through life, she will from time to time be presented with life necessities or desires (i.e. goals) that will require her to spend more money than her periodic income may support. Examples of such expenditures might include a new car, college, an engagement ring, a home, a child's college education, and retirement.

Periodically depositing money into an interest-bearing savings account is one way to set aside funds, but most people typically invest at least some portion of their savings. Such investments might include higher risk investments that offer higher returns or low-risk investments that offer lower returns.

How an investor chooses to allocate money among a number of lifetime expenditures may depend on many factors, such as the investor's personality (e.g. organized, spontaneous, etc.), the investor's periodic income and accumulated savings, the nature and relative costs of the goals (e.g. extravagant versus adequate), and knowledge of financial planning concepts. Based on these factors, some investors may take an ad hoc approach, such as funding an expenditure as it arises by using the most liquid investment in the investor's portfolio, while others might take a slightly more measured approach that is planned years in advance. For example, an investor may decide that savings in a 401k plan are to be used only for retirement, and nothing else. Others may retain a financial planner from a financial institution for professional help in planning expenditures and investments to meet those planned expenditures.

For the most part, the financial services industry has created a standard process by which a financial plan is created for individual investors. The process typically consists of investors gathering all their financial data, describing all their financial goals, and indicating their appetite for risk. From this data, a complete financial plan can be generated and an investment portfolio can be created to target the investor's goals and risk profile.

While such a plan may be the ideal situation (assuming the investments meet expectations), in reality there exists a large base of prospective customers that will never go through the financial planning process as defined by financial institutions. Many investors are not willing to take the time or energy involved with gathering all financial data, planning all goals, and determining risk comfort levels. Moreover, many investors are unwilling to relinquish control of their investment portfolio to a third party, and even if they use the financial planning process they still have a difficult time understanding performance of their money relative to the plan and the process. Therefore, there is a gap between the ideal process and the process that the majority of investors actually use to manage and track investments.

The following are observations about the financial planning process for many typical investors:

Many investors are only concerned with a single financial goal, or have limited time and want to focus on a small number of goals and will not allocate time for a lengthy financial planning process.

The financial planning process is intimidating for many investors.

Many individuals will continue to choose and implement their own investment/debt strategies.

For every financial position there is a reason why the investor/entity placed their money in that position. Many individual investment/debt strategies are implemented without rigorous analysis and may not be suited to a particular investor/entity. Most of these are not well defined and/or not monitored for performance over time.

Most investors that use a financial advisor for all or part of their money do not have an easy interface to obtain a real-time update on their advisor's performance and/or progress toward achievement of their financial plan.

Many investors will not use financial advisors because they do not trust them, and are not sure how to measure their effectiveness.

These observations, if true, indicate that traditional financial planning may never be utilized by some types of investors and can be further enhanced for those investors that utilize the traditional process. For these investors, alternative solutions to financial planning may be attractive. It is also important to note that these observations not only affect an investor, but they also apply to financial institutions who desire to provide financial services to an investor. Additionally, these observations apply to other related companies, such as financial software providers, that desire to provide financial tools to investors.

Accordingly, an alternative financial planning strategy should take into account the following assumptions:

Some planning is better than none. If an exhaustive financial plan is not undertaken, there is still a benefit to identifying one goal and tracking progress toward that one goal. More goals can be added later, allowing a plan to be built incrementally over time.

Investors will continue to develop and implement their own money management strategies with a wide range of sophistication. Performance tracking can help to show naïve investors any errors in their money management process and/or capabilities. Providing an effortless way to assign and track the reason(s) for investing will provide helpful feedback that the entity can use to modify their money management practices to benefit their financial status.

All levels of investors from the most basic to a very sophisticated investor can benefit from a more personalized system for organizing and tracking their money Goal oriented investors may want to be able to create simple life goals and track the utility of their financial assets relative to achievement of stated goals, goals which in many cases are not well understood in terms of financial assets. As a first example, consider an investor that wants to be able to pay for college for her two children. As a strategy oriented investor, she may have target incomes, returns and performance standards she is trying to achieve, and may be employing multiple types of trading strategies to achieve target returns. These types of investors are trying to find and employ strategies that are successful relative to the market, and/or absolutely successful relative to a target return level. As a second example, consider an investor who subscribes to a newsletter or magazine in which an investment advisor recommends five stocks as her top picks for the year. The investor may want to track those picks and determine if that advisor provides an adequate rate of return over time. At a higher level, the investor may want to track an aggregate of all third party picks against their own picks, or against the traditional market benchmarks over time. This will help the investor understand if they are better off using outside recommendations or their own ideas. Ultimately for the majority of intended users, it may be ideal to integrate and track life goals with dynamically changing investment and savings strategies over time. So in an ideal case, an investor may create multiple life goals and employ multiple strategies to try and achieve those goals.

Once life goals are established, investment performance necessary to achieve goals can be derived in order to define the utility of the financial assets relative to the goals. It is therefore advantageous in tracking goals to understand how well investments are performing so that corrective action can be taken to improve the likelihood that goals are achieved. Additionally and/or alternatively, for investors focused on investment strategies, it is important to track the success of strategies over time so an investor is able to discard strategies that are not successful.

It would be desirable to have a system that allows users to track performance of one or more personalized life goals in isolation, or as aggregated with a larger hierarchy and/or cloud of goals and strategies. An instance of this grouping and tracking can be called a Money Pool. Ideally, the system would be able to address the compounded problem that may occur when financial positions are distributed in whole or part across multiple accounts at one or more financial institutions.

Some financial institutions and related companies provide web based applications that allow individuals to track financial positions by account and in some cases aggregated across accounts at that institution and outside institutions. These interfaces allow for tracking of gains and losses on financial positions. There may also be financial planning tools to help individuals analyze their financial position and potential to achieve goals like retirement income and college expenses.

However, what the financial institution and existing applications fail to provide to an investor is the ability to create, categorize, store, and monitor separate personalized hierarchies and/or clouds of money pools consisting not by accounts but by goals/purposes, strategies/tactics, entities/beneficiaries, and tax-status, for example, against which financial positions can be applied in whole or part. Furthermore, there are no multiple hierarchies and/or clouds of money pools consisting of goals/purposes, strategies/tactics, entities/beneficiaries, and tax-status, that can be applied across financial positions in multiple accounts at one institution, or across multiple accounts at multiple institutions.

A separate personalized hierarchy and/or cloud of money pools would allow financial institutions and advisors to better understand their customers' needs, both as individuals and in aggregate. Therefore, also lacking in the art is a higher-level monitoring tool to allow financial institutions, employers, and other entities to track money pools created by an institution and provided to large numbers of investors, in order to provide improved services to would-be investors. Such improved services could include, for example, a new investment offering consisting of a portfolio of investments that other users have successfully associated with pools for college education targeted at a specific time horizon. Furthermore, a financial institution could track third party investment strategies they introduce to investors and even investor created strategies and integrate those into their money pool system so that other entities could use them as money pool templates. It would be desirable if such templates were predefined, perhaps by a financial institution or other third party. In addition, it would be desirable if these templates could be activated in a variety ways It would also be desirable if a personalized pool based system for organizing and tracking financial positions could provide access to a large network of pools and pool templates created and/or managed by an unlimited number of financial institutions, third party financial experts, social networking communities and other investors. Such a network would provide an investor with the ability to search and filter the available universe of pool templates based on personalized criteria that would include but not be limited to, time horizon, purpose, style, risk scores, etc. Pool templates selected from the network by the investor could be implemented within investor owned accounts at the investor's financial institution's system of record by the investor or by outside parties. The pool network could be maintained by a financial institution or independent third party.

Thus, it would be desirable to have a computerized system and method for creating, adopting, subscribing to, managing, measuring and tracking money pools and money pool templates, to improve the financial planning and money management processes for individuals and entities.

BRIEF DESCRIPTION OF THE DRAWINGS

Preferred embodiments of the present invention are described with reference to the following drawings, wherein:

FIG. 1B is a flow diagram and associated pictorial diagram of a method of operating a Pool-based System for Organizing and Measuring Personalized Financial Management Techniques;

FIG. 4A-I are diagrams illustrating example interfaces; and

FIGS. 5A-E are diagrams illustrating institution generated reports.

SUMMARY

A Pool-based System for Organizing and Measuring Financial Management Techniques and method of operation is presented. In one embodiment, the pool system includes a plurality of financial positions that are allocated to a plurality of pools. A first category may contain a first plurality of pools. A second category may contain a second plurality of pools. A first portion of the financial positions is allocated to a first pool within the first plurality of pools. A second portion of the financial positions is allocated to a second position within the second plurality of pools. The first and second portions overlap in that they share at least one financial position, allowing a user to view aggregated financial positions that are common to the first and second categories. A third pool may be subsequently created. The third pool may contain of variety of combination selected from the plurality of pools and the plurality of financial positions.

In another embodiment, a pool and/or a category is derived from a pool template. The template can then be shared over a pool system network. The pool system network includes a plurality of networked local pool systems.

These as well as other aspects and advantages will become apparent to those of ordinary skill in the art by reading the following detailed description, with reference where appropriate to the accompanying drawings. Further, it is understood that this summary is merely an example and is not intended to limit the scope of the claims.

DETAILED DESCRIPTION OF PRESENTLY PREFERRED EMBODIMENTS

In view of the wide variety of embodiments to which the principles of the present invention can be applied, it should be understood that the illustrated embodiments are examples only, and should not be taken as limiting the scope of the present invention. In some of the described embodiments below a user or investor is described, it is understood however, that the described embodiments are not limited to being used by a single "investor" or "user". It should be apparent in the art that a wide of variety of users may implement the described embodiments.

Figure 1A:
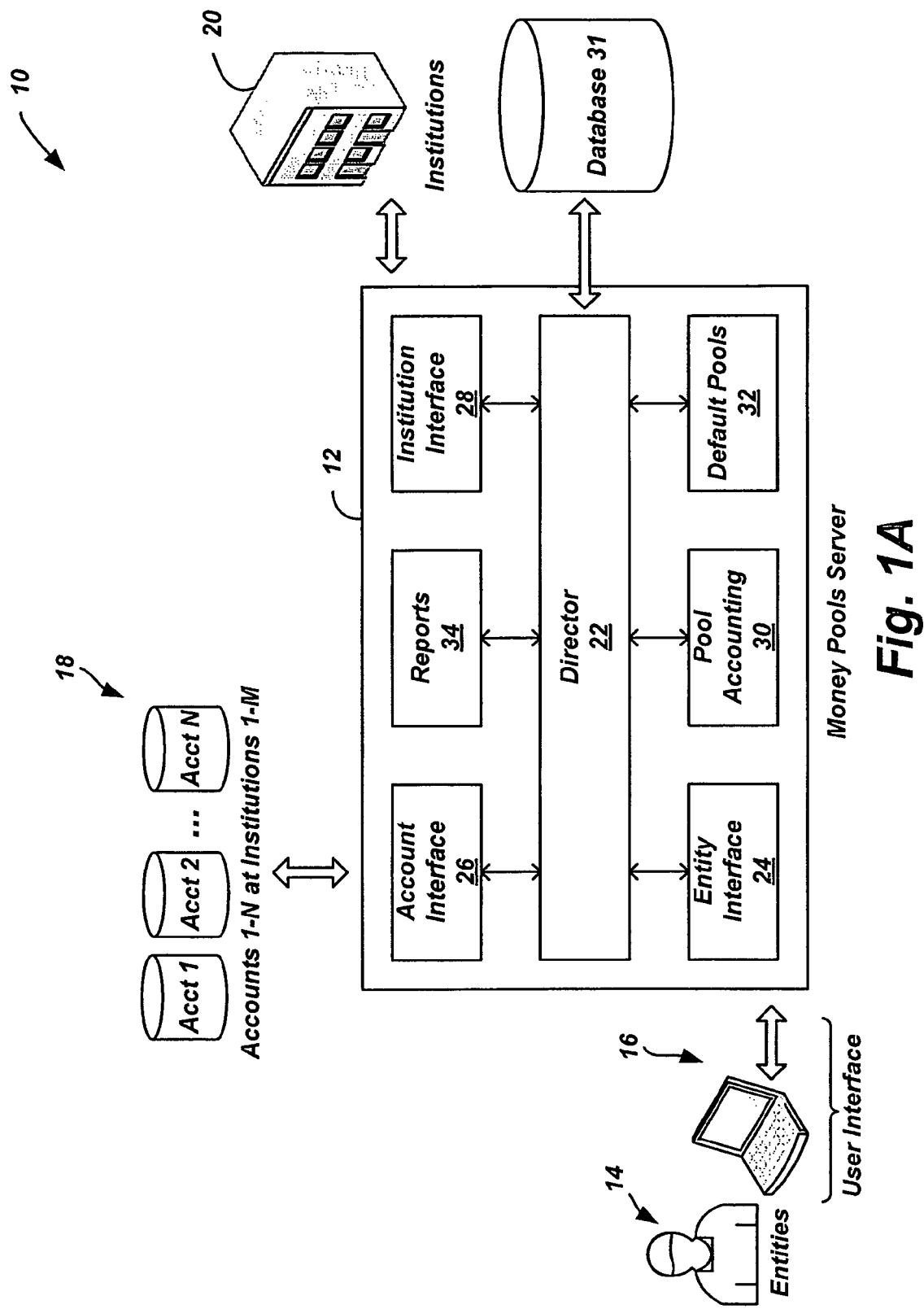
FIG. 1A is a simplified block diagram illustrating interfaces and components associated with a Pool-based System for Organizing and Measuring Personalized Financial Management Techniques.

A Pool-Based System for Organizing and Measuring Financial Management Techniques FIG. 1 is a simplified block diagram illustrating a Pool-based System for Organizing and Measuring Financial Management Techniques 10, according to one embodiment of the present invention. The system 10 includes a money pools server 12 that an entity 14 may access through a user interface 16. For example, the entity 14 may be an individual investor or an investment advisor working to assist an individual investor. The user interface 16 is preferably a web-based client application running on a computer that communicates with the server 12 over an Internet connection. Other implementations are also possible for the user interface 16, such as a hard-wired network terminal located at the same facility that houses the money pools server 12. The user interface 16 will preferably include at least a graphical user interface (GUI) to enable visual communications with the entity 14 and a communication pathway (wired or wireless) between the entity 14 and the server 12. Such a communication pathway should be secured using encryption and/or other known network security mechanisms.

The server 12 can be in communication with one or more accounts 18 affiliated with one or more institutions and/or accounts 18 can be modeled and input into the server 12 by the entity 14 via the user interface 16. For example, the entity 14 may have financial assets maintained in N accounts affiliated with M institutions. The accounts 18 may include savings accounts, investment accounts, retirement accounts, debts and other accounts for tracking financial assets or instruments. The institutions maintaining the accounts 18 may include banks, brokerages, online trading companies, employers, and others. Communications between the server 12 and the accounts 18 are preferably made via a secure Internet connection, but may also be via a hard-wired direct connection, for example.

The server 12 may also be in communication with one or more institutions 20 that may access the server 12 (and possibly other money pools servers like the server 12) to track and/or manage pool information for a plurality of entities like the entity 14. These institutions 20 may be the same as or different from the institutions with which the accounts 18 are affiliated. For example, institutions 20 may include corporations that monitor their employee's 401k investments in similarly situated pools defined by life goals and/or investment strategy. Communications between the server 12 and the institutions 20 are preferably made via a secure Internet connection, but may also be via a hard-wired direct connection, for example.

To provide pool-based management and monitoring functions, the server 12 preferably includes a director 22, a user interface 24, an account interface 26, an institution interface 28, a pool accounting function 30, a default pool function 32, and a reports function 34.

The director 22 preferably makes use of one or more processors to coordinate communications internal and external to the server 12 and to run software to allow entities 14 to create, manage, and/or track money pools. The director 22 may also run software to allow the institution to track and/or manage pool information for a plurality of entities. In an alternative embodiment, the director 22 comprises hardware and/or firmware, instead of or in addition to processor(s) running software.

The user interface 24 preferably includes hardware and software routines that the server 12 uses for communicating with the user interface 16 to the entity 14. For example, the user interface 24 may include a connection to the Internet and a network protocol stack for sending messages to and receiving messages from the entity 14 accessing the server 12 through the user interface 16.

The account interface 26 preferably includes hardware and software routines that the server 12 uses for communicating with the accounts 18. For example, the account interface 26 may include a connection to the Internet and a network protocol stack for sending messages to and receiving messages from the accounts 18. Because the accounts 18 are likely to be stored in one or more databases, a database access utility may be present at the institution(s) maintaining the accounts 18. If the server 12 is affiliated with the same institution that maintains the accounts 18, then the account interface 26 may include database access functionality as well.

The institution interface 28 preferably includes hardware and software routines that the institutions 20 use for communicating with the server 12. For example, the institution interface 28 may include a connection to the Internet and a network protocol stack for sending messages to and receiving messages from the institutions 20.

The pool accounting functionality 30 stores and updates information associated with pools created by or for the entity 14 in a database 31. For example, the pool accounting function 30 may include periodic or real-time updating of prices and quantities of financial assets owned by the entity 14. Such price and quantity information may be received directly from financial markets, from institutions that maintain the accounts 18, or from another source. Other data that may be periodically or updated in real-time from various sources are risk scores/ratings, asset classification data, updated account information from third party aggregation services, etc. Additionally, the pool accounting functionality includes tracking and processing fees for pool system access and/or template activation/usage from credit card companies, PayPal and similar services, ACH, etc.

The default pools function 32 includes default passive pools, pool monitors and pool models and may be included to assist in pool planning and in identifying trends in pools created by entities, according to a preferred embodiment. As one example, the default pools function 32 may be a predetermined set of pools for common life goals, such as college planning, purchase of a second home, etc. As another example, default pools could be dynamically created by identifying similar pools created by different entities using the money pools system 10. If several hundred entities each create a "child's college" money pool, and a few dozen of those several hundred assign an index fund (e.g. S&P 500 index), then the default pools function might create a default pool that others can use to plan for college as other investors have.

Default pools can also be offered as pool models of more complex bundles of pools that address a hierarchy of both purposes and tactics pre-defined for the basic user. Institutions can create pool templates and enable for entities default passive pools and pool monitors.

The reports function 34 can be used to create reports for the entity 14 to allow the entity 14 to manage and track pool performance. As one example, the entity 14 could bundle all tactic pools created to track third party experts that were used to invest money. In aggregate entity 14 could look at a report showing how all the experts did over a multi-year period and then view one expert specifically as part of the analysis. In addition, in some embodiments, the reports function 34 may be used to create reports for the institutions 20. Reports for the institutions 20 may include aggregate pool information for pools attributed to many entities. As one example, the institutions could view a multi-year report showing how all the institution's recommended pools were adopted and how they performed. To create reports, the reports function 34 should preferably have access to relative performance indicators, such as market moving averages, averages of funds in similar sectors, and others.

Allocating Financial Positions to Pools

FIG. 1B is a flow diagram and an associated pictorial diagram illustrating a method 100 of how an entity may manage financial positions using money pools and the system 10 described above or a similar such system. The entity may have accounts held at several institutions. Using system 10, the entity may access some or all of the accounts held at each the institution. Each account has one or more financial positions associated with it. Each financial position may have an associated financial position descriptor, unit of measure descriptor, and an associated quantity. A financial position may be a financial instrument such as a stock, a bond, a mutual fund, an option position, cash, a collectable, and a real estate holding. A financial position may also be a financial liability such as a mortgage. In addition, the financial positions may be available publicly or privately. At step 102, a plurality of financial positions 104 is stored in the system 10.

At step 106, a portion 108 of the financial positions 104 is allocated to a pool 110 associated within a category 112. The category 112 itself may be viewed as a pool as it contains pools that share an investment reason such a tactic/strategy, a tax status, person/entity, purpose/goal, or a liability type, for example. Category 112 may be a tactic/strategy category. If so, it may contain pools having pool reasons that are (a) based on the recommendation of a financial advisor, (b) financial positions based on the recommendation of a publication, and (c) financial positions based on a financial instrument rating system, for example. Pool 110 could be a pool associated with a recommendation of a friend of this particular entity's money pools instance. The pool 110 is located within a plurality of pools 114. Each pool within the plurality of pools 114 may include up 100% of a particular financial position. Overall, these pool reasons may be determined by a user, a financial institution, or a third party that designed a particular pool system instance. Other example categories and associated pool reasons are illustrated in Table 1.

TABLE 1

Example categories and pool reasons for pools contained in a category

| Category | Pool Reasons |
|---|---|
| Tax status | (a) a non-taxable status |
|  | (b) a taxable status |

TABLE 1-continued

Example categories and pool reasons for pools contained in a category

| Category | Pool Reasons |
|---|---|
|  | (c) a tax-deferred status |
| Person/entity | (a) a family member |
|  | (b) a child |
|  | (c) a business |
|  | (d) a household |
| Purpose/goal | (a) targeted for a college expenditure |
|  | (b) targeted for a wedding expenditure |
|  | (c) targeted for retirement |
| Liability | (a) a loan |
|  | (b) an interest payment |
|  | (c) a financial loss |

At step 116, portion 118 of financial positions 104 is designated to pool 120, which is located in a different plurality of pools 122. These pools are associated with a different category 124. In designating the second portion, some financial positions are now designated inside of pools in both categories. This allows a user to view at least one pool selected from the plurality of pools 114 with respect to at least one pool selected from the plurality of pools 122 via aggregated financial positions that are common to the plurality of pools 114 and 122. In this example, a user may view, or monitor, a pool from different aspects. One aspect may be a tax status as described above; a second aspect may be a liability (i.e., category 124), for example. Performance metrics may also be viewed by such aspects.

At step 126, pool 128 is created. Pool 128 includes pool 110 as well as financial positions located in portion 130. Another pool located in the plurality of pools 114 may contain all of the financial positions located in portion 130. Alternatively, portion 130 may contain some financial positions not located in any of the plurality of pools 114. In addition, portion 130 may contain financial positions which are not located in other pools except pool 128. All of the financial positions located in the third pool, however, share a common pool reason.

Figure 1C:
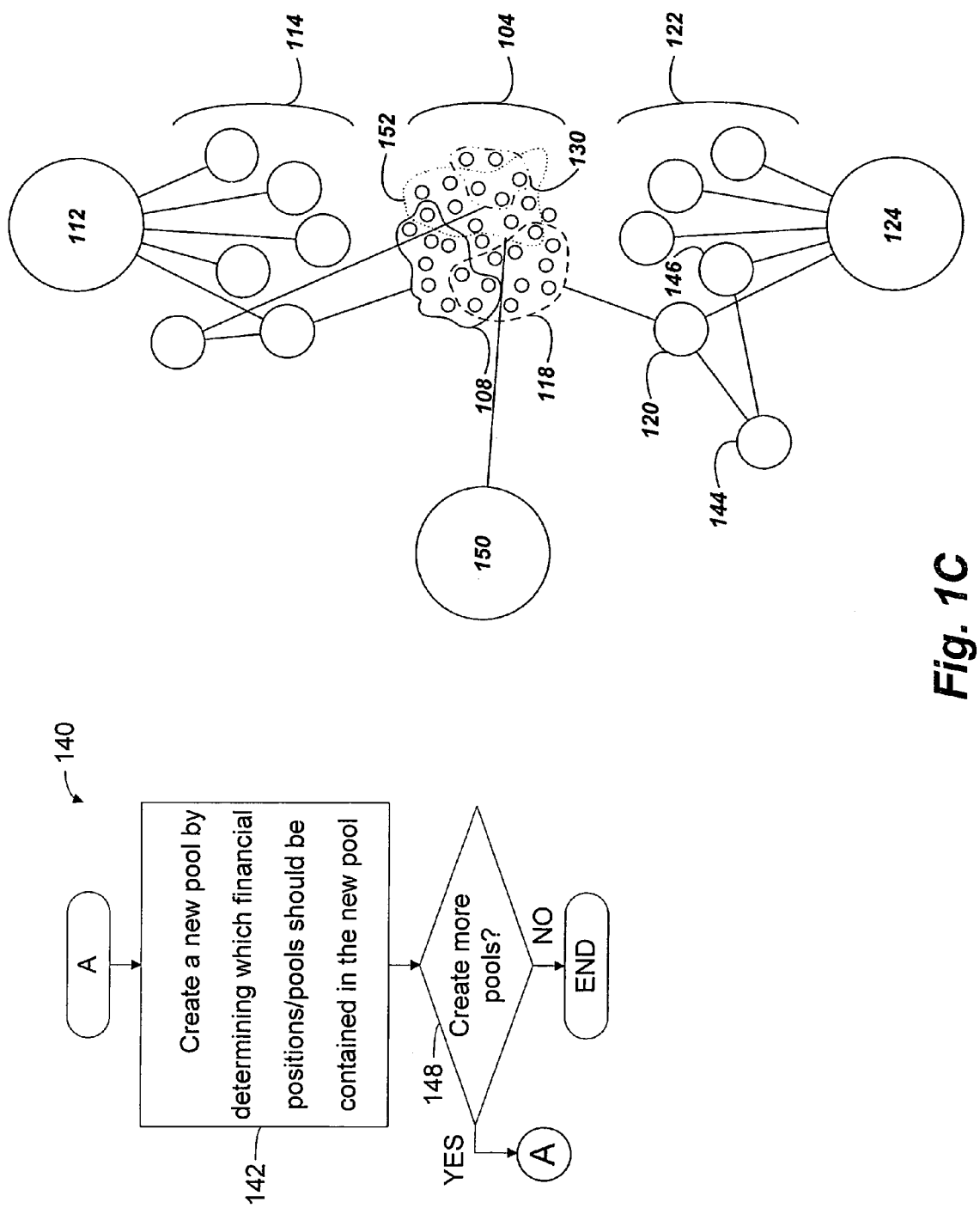
FIG. 1C is another flow diagram and associated pictorial diagram of a method of operating a Pool-based System for Organizing and Measuring Personalized Financial Management Techniques.

At step 134, more pools may be added. FIG. 1C illustrates a flow diagram and an associated pictorial diagram illustrating a method 140 of adding another pool. At step 142, after determining that another pool is to be added, pool 144 is created. Pool 144 contains pools 120 and 146, and therefore includes all of the financial positions located in both of these pools.

At step 148, more pools may be added by referring back to step 142. As described above, categories may in fact be viewed as pools. Pool 150, which is a category, is added at step 142. Pool 150 contains portions 152 of financial positions 104. Portion 152 includes financial positions located in portions 108, 118, and 130 as well financial positions not located within these portions. Other examples of categories, associated pool reasons, and higher level pool reason bundles are illustrated in Table 2.

TABLE 2

Additional example catergories and pool reason for pools contained in a category

| Category | Pool Reasons | Pool Reasons |
|---|---|---|
| Person/entity | (a) a $1^{st}$ child | (e) All Children |
|  | (b) a $2^{nd}$ child | contains (a) and (b) |
|  | (c) a $1^{st}$ business | (f) All businesses |
|  | (d) a $2^{nd}$ business | contains (c) and (d) |

TABLE 2-continued

Additional example catergories and pool reason for pools contained in a category

| Category | Pool Reasons | Pool Reasons |
| --- | --- | --- |
| Purpose/goal | (a) targeted for a college expenditure child 1<br>(b) targeted for a college expenditure child 2<br>(c) targeted for a college expenditure Graduate school | (d) targeted for all college expenditures. Contains (a), (b), and (c) |
| Tactic | (a) Advisor #2<br>(b) Magazine top 10<br>(c) Mutual Fund Five Star<br>(d) My hot picks<br>(e) My technology | (f) $3^{rd}$ Party Experts, contains (a), (b), (c)<br>(g) My Picks, contains (d), (e) |

One way for financial institutions and third parties to facilitate implementation of the pool system and products and services that address the demands of the pool system users is to provide pre-defined pool templates. Pool templates may be based on expected commonly demanded reasons in each of the categories, strategic/tactical, goal/purpose, tax status, and entity/beneficiary, and are available to become active pools when an investor assigns financial positions to an available template. As an example, in the strategy/tactic category a financial institution might have pool templates named Investment Magazine Picks, or Institution's High Rated Stocks. An entity can activate these pool templates into personal, active pool instances by selecting a pool template or set of pool templates and assigning financial positions. An entity will benefit from the pool template's pre-defined performance analysis data and associated analytic capabilities. In addition, such pool templates can automatically associate the newly activated pool with other pre-defined pools in a larger hierarchy that allows an entity to automatically create the framework for a pool-based financial plan with the assignment of limited financial positions into one active pool instance.

As described above, a template may be created by a financial institution or other third party. Templates may be included in the default pools function 32. Templates can include a hierarchy and/or a cloud of pools and bundle pools across multiple categories. The system 10 may receive from a pool system network or have created within it predetermined pool models and/or category models that may be activated by a user. A financial institution or pool system provider may receive a payment for such activation. In addition, a template may be created and managed by a user. Alternatively, a template may be created and managed by a third party or a financial institution.

Another way that a template may be activated in the system 10 is by the use of a pool monitor. The pool monitor may monitor the system 10 via a network or it may be embedded within a pool system instance. Passive allocations of financial positions to a particular pool or category may be determined by the pool monitor. The pool monitor may use a variety of strategies to determine appropriate allocations. For example, the pool monitor may be derived from an investment strategy that a particular financial institution describes to a pool monitor system. These allocations may be allocated by the pool monitor itself or upon a user's desire to implement or activate the monitor. The pool monitor may run in the background of the system 10 and may not become available until the user desires to use a pool derived by the pool monitor, for example.

Templates may also be distributed to a network of pool systems. In a pool system network, users, financial institutions, and other third parties may use and evaluate received templates; new templates may be created based on old templates; or entirely new templates may be created and subsequently shared. In addition, a user may be able to input search parameters to search the local pool system instance and/or a pool system network for a desired pool model that suites their needs. Some pool system networks may require a subscription fee for accessing, receiving, or searching for a particular template. Such a pool system network may also be administered by a variety of entities.

Associating Life Goals and Investment Strategies with Pools

Figure 2A:
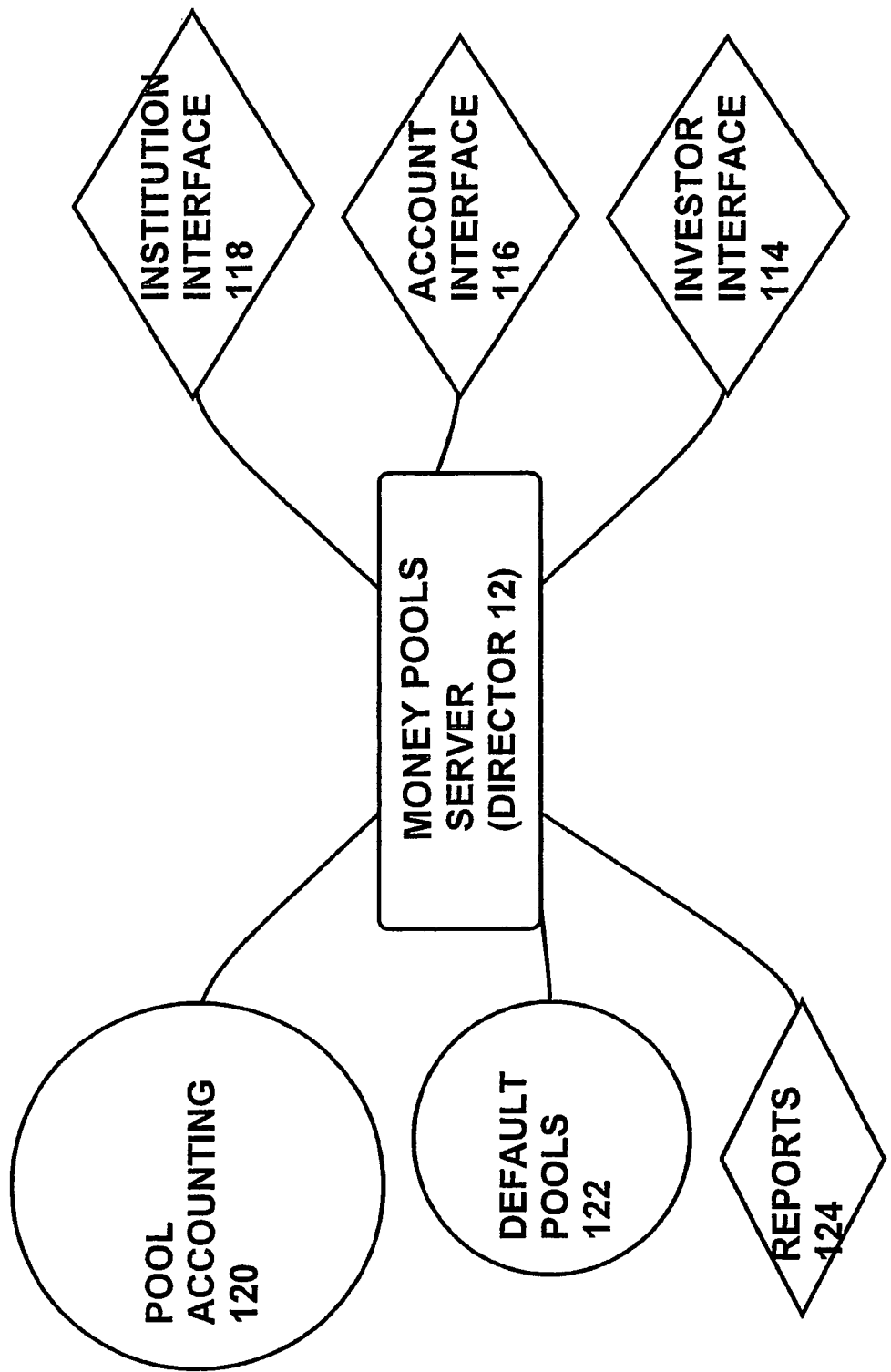
FIGS. 2A-M are relational diagrams showing an example of a pool structure for a plurality of accounts held at a plurality of financial institutions.
Figure 2B:
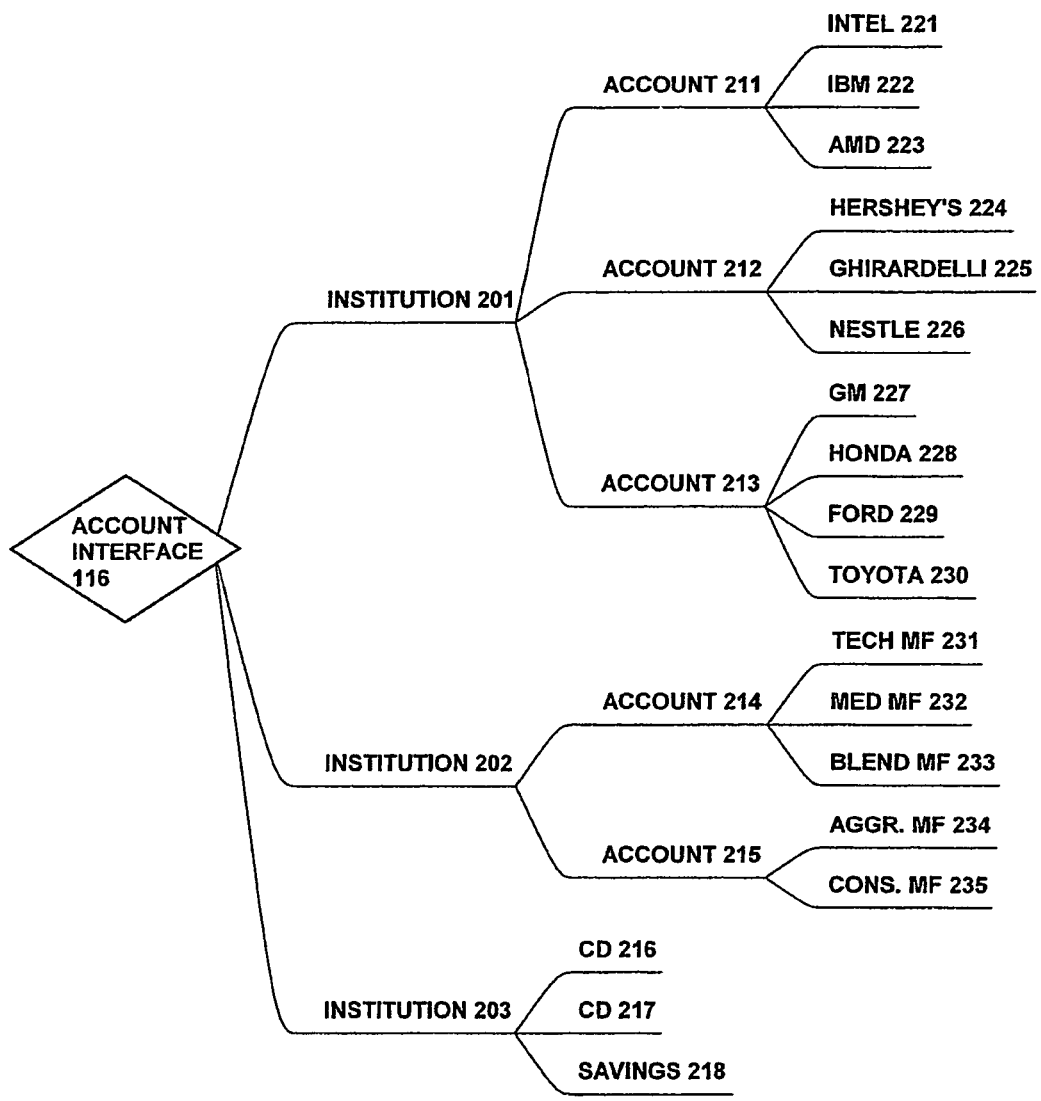

FIG. 2A is a block diagram illustrating how a user may manage her finances using money pools and the system 10 described above. Using system 10, the user may access some or all of the accounts held at each institution. For example, as illustrated in FIG. 2B, user 14 may evaluate institutions 201-203 and accounts 211-218 (via user interface 24 and account interface, 26). Each account has one or more financial positions associated with it. As described above, a financial position may be shares of stock, a mutual fund, or other type of investment, for example. An account may also have or consist of only one financial position, such as CD 216, CD 217, and savings account 218.

The user may have invested in a financial position for a variety of reasons. These reasons include, perceived risk/return assessment, advice from a financial advisor, a financial strategy (such as Validea), a magazine pick, and/or advice from a friend. The reasoning for investing in each position is often varied and changes over time. The user may have been inexperienced when she first opened her accounts; however, as she grows in experience, she may become more savvy. Initial investment strategies may develop into different strategies over time. System 10, therefore, allows a user to track her investment strategy and easily determine why a financial position was purchased. This allows the user, who may have been intimidated by the overwhelming number of available strategies, to gauge performance of financial positions within a strategy. The user can gradually adapt system 10 to her preferences.

System 10 may be used for a wide spectrum of entities that range from organized to spontaneous, having financial management strategies that vary from marginally adequate to complex and sophisticated. System 10 achieves this adaptation by using tactical and purpose pools. A financial position is allocated to a tactical pool within a tactics category. The same financial position may also be allocated to a purpose pool within a purpose category. A tactical pool may represent a strategy that the user may associate with a financial position. A purpose pool may represent a life goal that the user may also want to associate with a financial position.

Figure 2C:
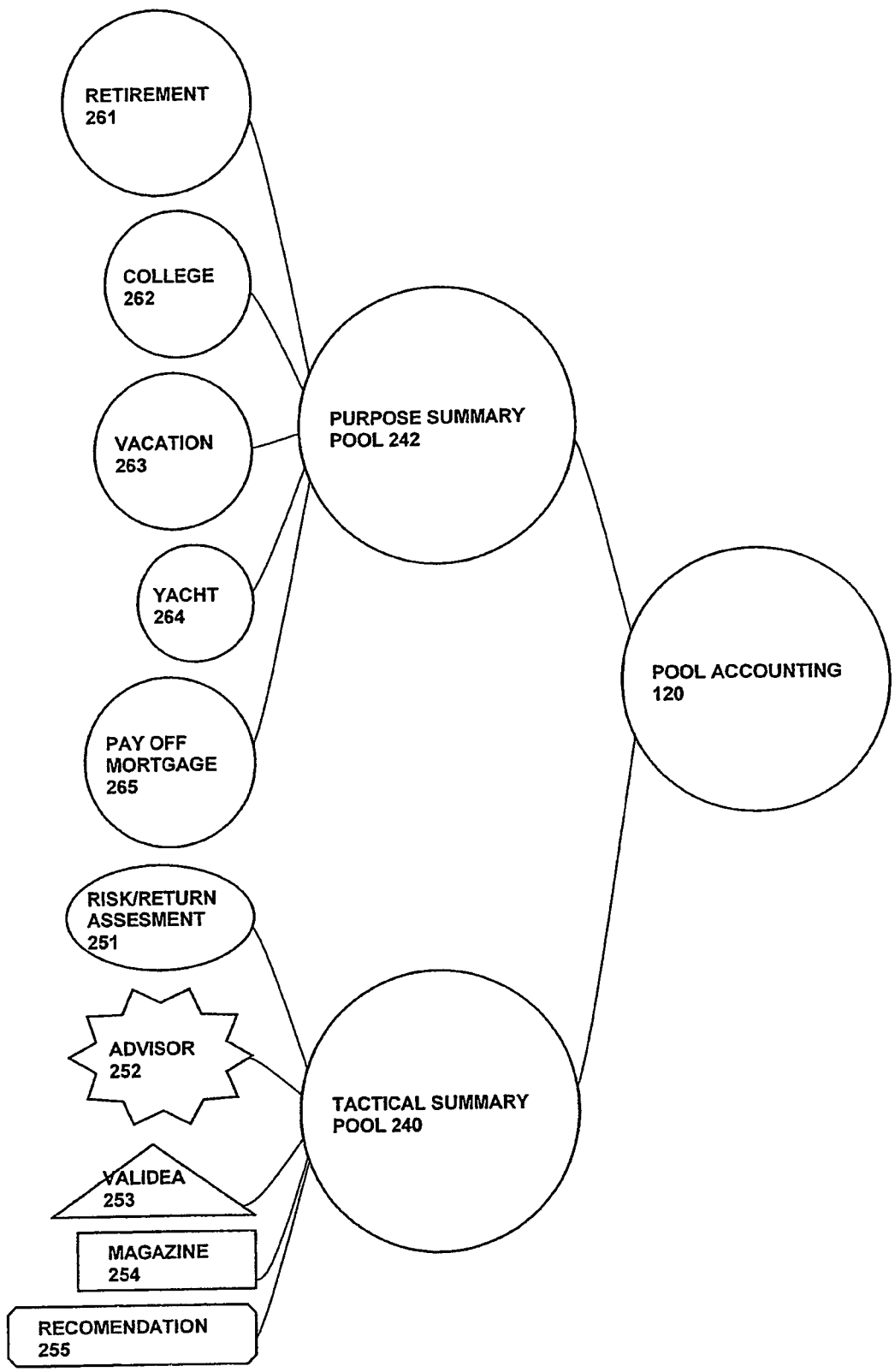

Illustrated in FIG. 2C are tactical summary pool 240 and purpose summary pool 242. Tactical summary pool 240 contains tactical pools 251-255. Purpose summary pool 242 contains purpose pools 261-265. Tactics and purposes are examples of pool categories.

Figure 2D:
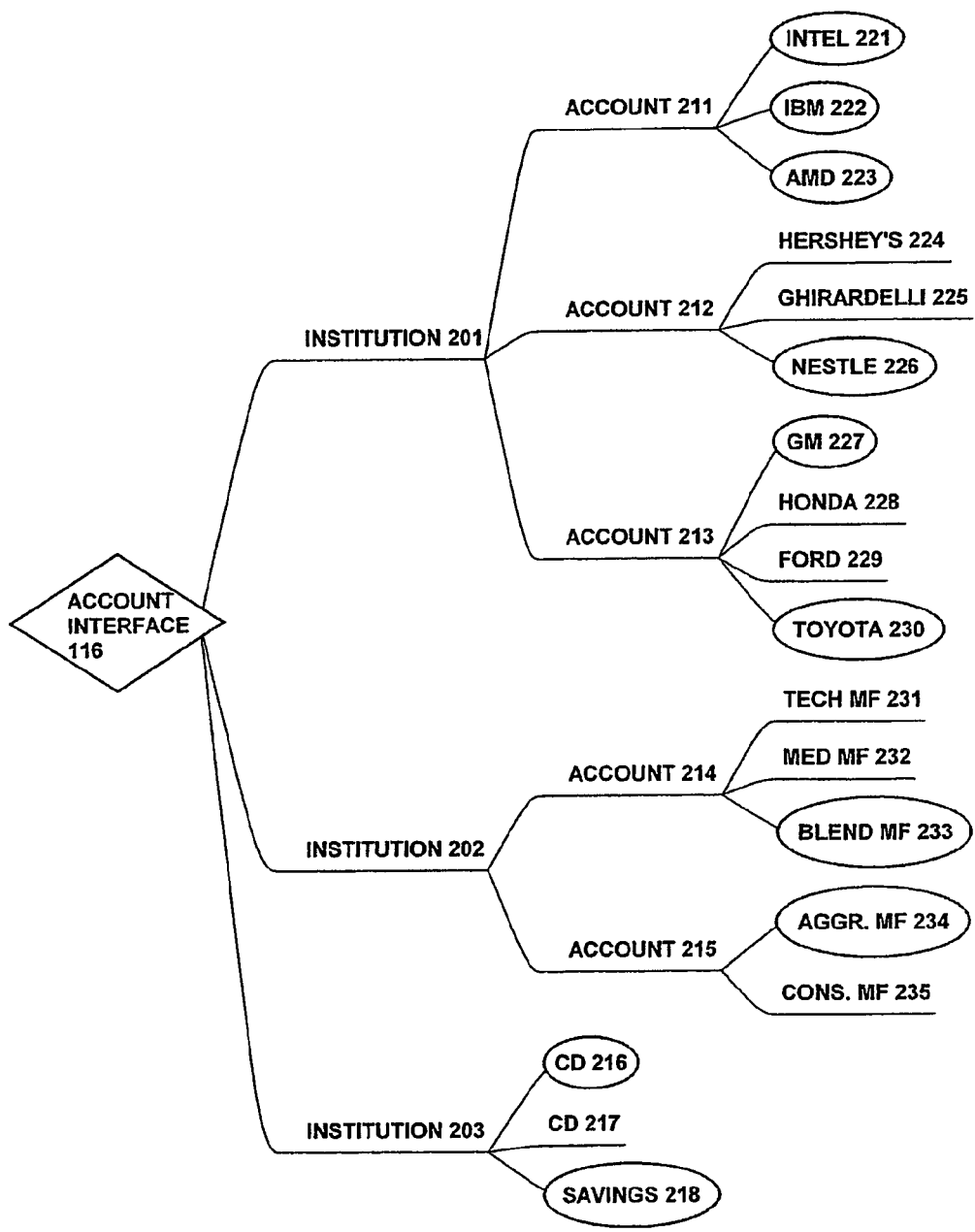

Because users employ a variety of strategies, the tactical pools allow a user to group her financial positions based on a particular investment strategy. This allows the user to track the reasoning behind a particular financial position. For example, in FIG. 2D, the user may be familiar with "tech" stocks 221-223, "chocolate" stock 226, "auto" stocks 227 and 230, blended mutual fund 233, aggressive mutual fund 234, CD 216, and savings account 218. The user may group these financial positions into the risk/return tactical pool 251 based on the user's own assessment of these financial positions. Further, by being able to create pools of pools, a user has great flexibility to organize tactics in sub-groups that will help understand the success of a broader approach. For example, an user wants to understand how their own stock pick ideas fair against third party experts. Under each pool, user ideas and third party ideas, might be a number of more refined tactic pools. But being able to group them at the higher level allows for a better understanding regarding the user's own capabilities.

Figure 2E:
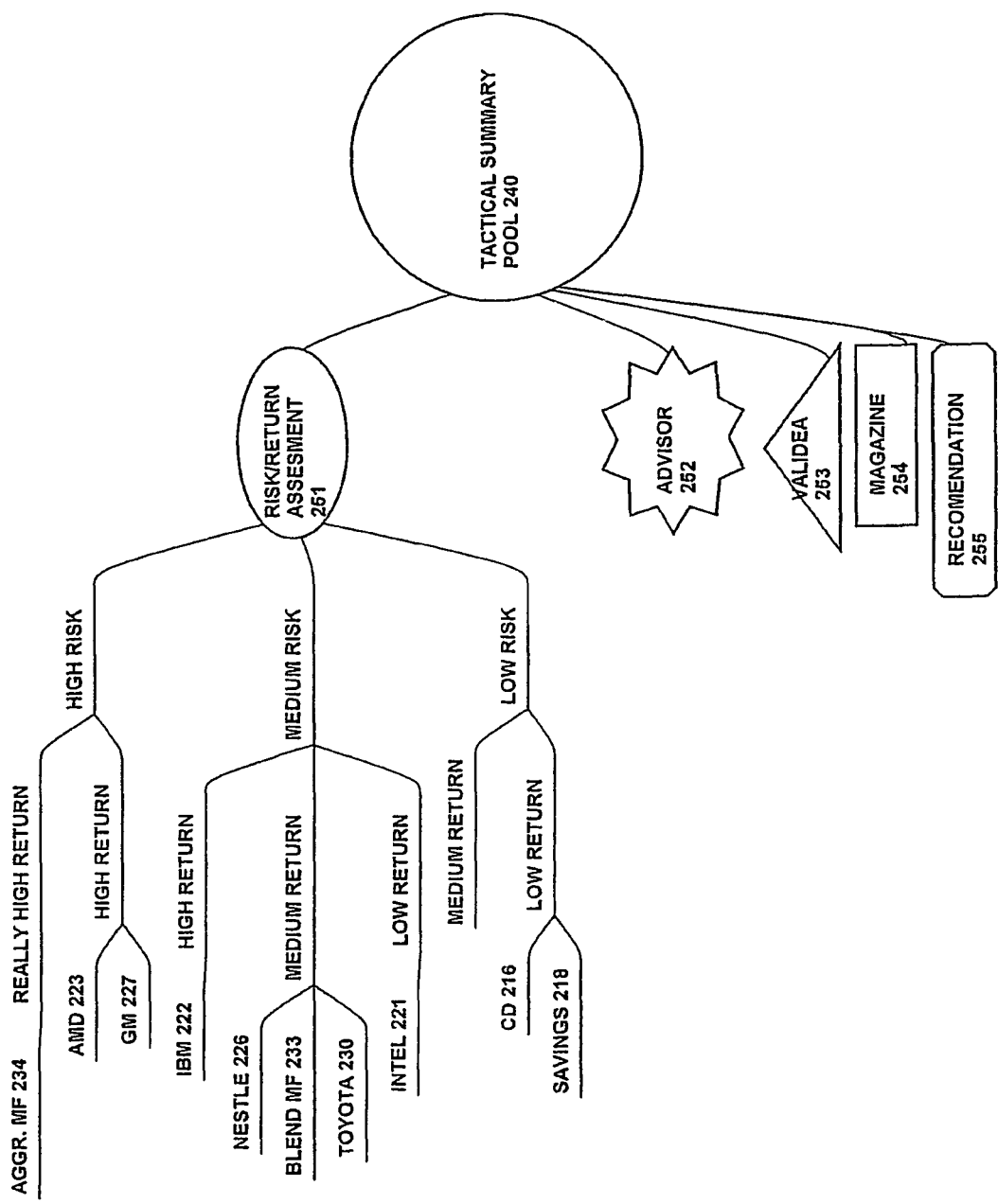

In FIG. 2E, the risk/return assessment tactical pool 251 contains financial positions 221-223, 226, 227, 230, 233, 234, 216, and 218. Each financial position is further grouped into a sub-tactical pool based on a position's risk and return value. In other examples, additional sub-tactical pools may be added to increase the possible groupings of financial positions.

Figure 2F:
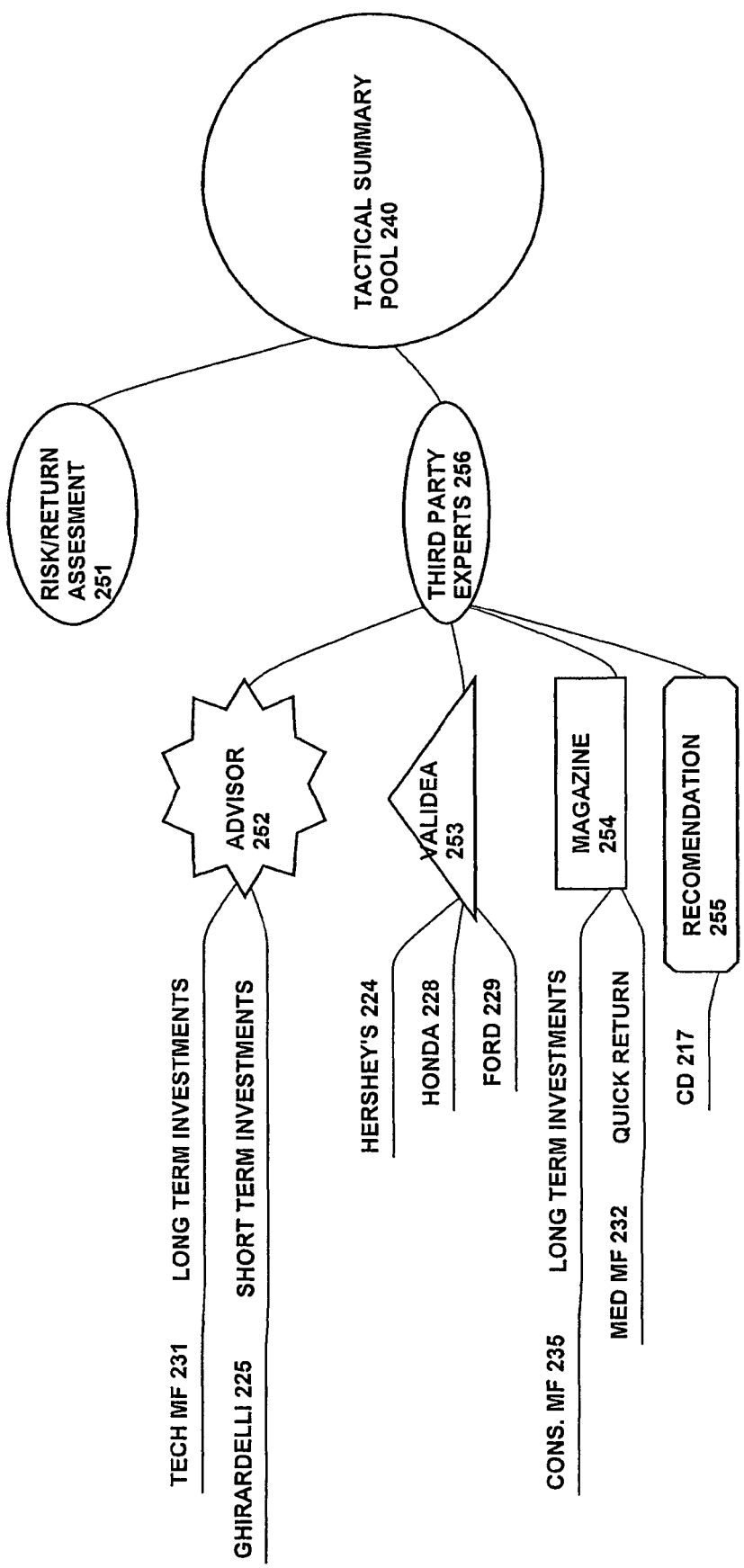

In FIG. 2F, the user may have been advised by a financial advisor that tech mutual find 231 is a reliable long term investment. The same advisor may also predict that Ghirardelli 225 anticipates record Valentine's Day sales; it may be a good short term investment. The advisor tactical pool 252 contains both of these financial positions. Also shown in FIG. 2F, is a Third Party Experts pool 256, and the remaining advisor 252, Validea 253, magazine 254, and recommendation 255 tactical pools which are filled with financial positions. The advisor 252, Validea 253, magazine 254, and recommendation 255 tactical pools are "sub"-tactical pools when viewed via the Third Party Experts 256 pool. The Third Party Experts pool 256 may be used to aggregate performance of all third party experts 252-255. The user will be able to see the performance any time of the group, as well as track a long-term historical performance with multiple experts that might include third party experts that are terminated from time to time as well. The Third Party Experts pool 256 may have been created prior to or subsequent to the creation of any of the advisor 252, Validea 253, magazine 254, and recommendation 255 tactical pools.

A Validea strategy (Validea tactical pool 253) may suggest "auto" stocks 228 and 229 and Hershey's chocolate 224. The user may not initially be comfortable with using Validea tactical pool 253. The user may allocate a limited number of financial positions initially, evaluate how well the strategy works, and allocate more financial positions at a later time.

A financial magazine (magazine tactical pool 254) may suggest a conservative mutual fund 235 for a long term investment and a medical mutual fund 232 for a quick return. These two financial positions may be the top picks in the magazine. The user could allocate more or fewer financial positions after evaluating the performance of the magazine's picks.

A friend of the user may have had a good experience and recommended CD 217 (recommendation tactical pool 255). Again, this financial position could be isolated to a tactical pool so that it may be tracked by itself.

Figure 2G:
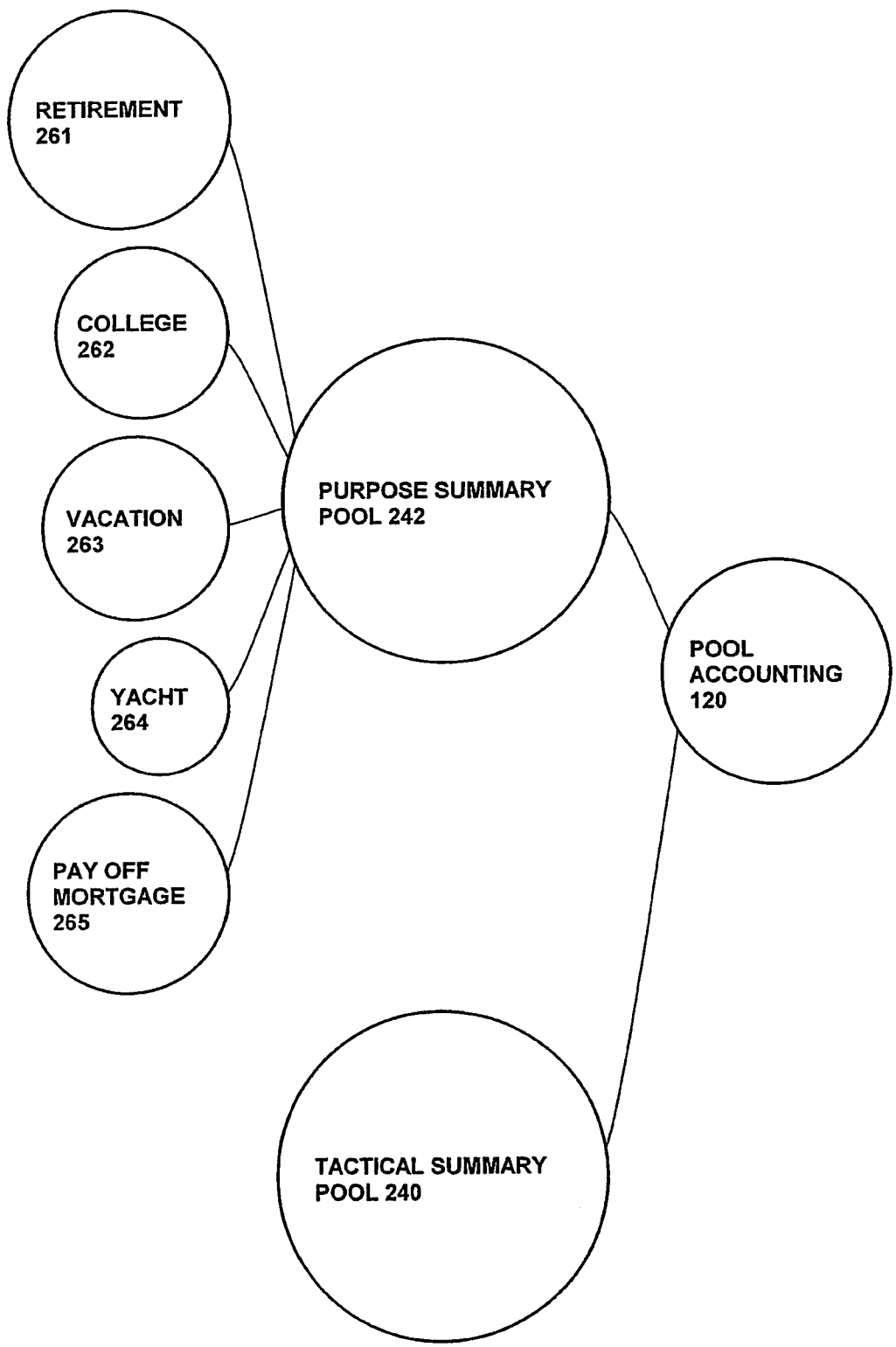

Using the tactical pools 251-255, the user may also determine a particular purpose pool that a financial position should be placed in. FIG. 2G illustrates purpose pools associated with purpose summary pool 242. The purpose pools in this example include retirement 261, college 262, vacation 263, yacht 264, and mortgage payoff 265.

Because some of these purposes may be more important than others, the user may use an investment strategies associated with a tactical pool to guide her allocation of financial positions to purpose pools. For example, owning a yacht (purpose pool 264) may be a less important life goal than providing college tuition (purpose pool 262) for the user's children.

Figure 2H:
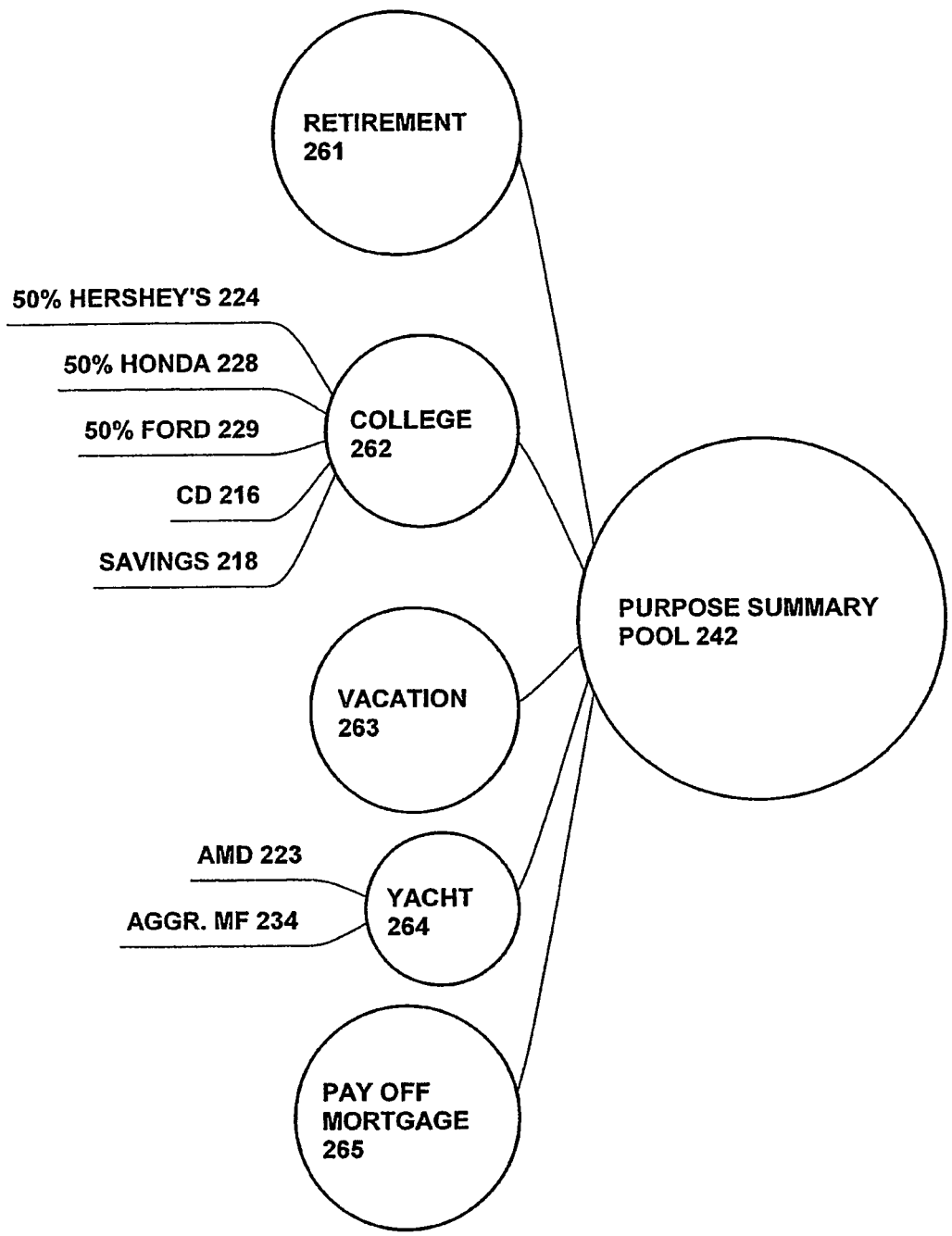

FIG. 2H illustrates allocation of positions to the college and yacht purpose pools 262 and 264. Because the yacht purpose pool 264 is not as important as others, an user may look to the riskier tactical pools when allocating financial positions to this pool. The yacht purpose pool 264 may include stock for AMD 223 and aggressive mutual fund 234. The user may allocate safer investments (e.g. non-tech stocks) to the college purpose pool 262. In this example, the user has allocated half of her shares in the Validea tactical pool 253. Additionally, she has also invested low risk financial positions CD 216 and saving 218.

Figure 2I:
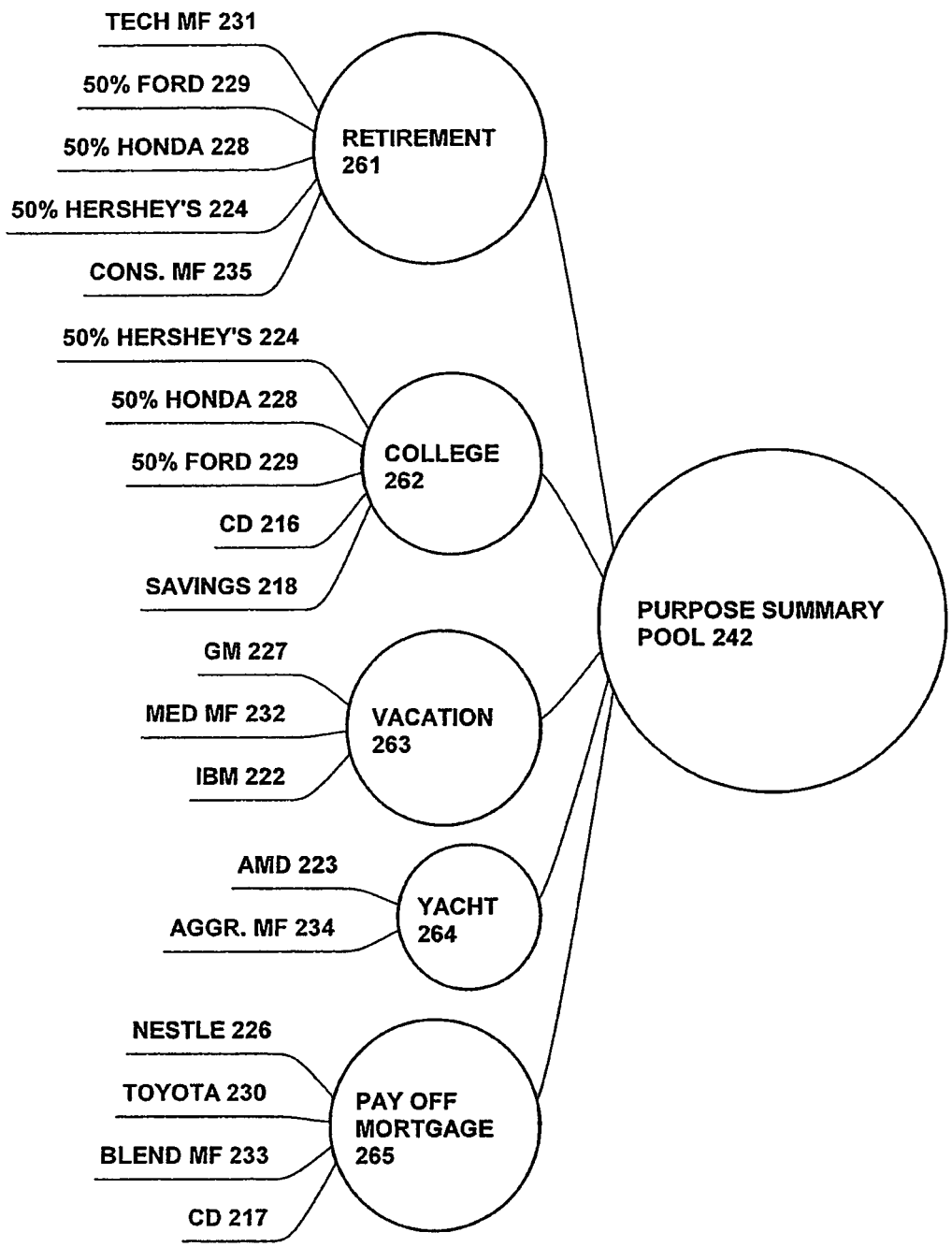

FIG. 2I illustrates other positions allocated to the other purpose pools. Notice that not all of the positions have been allocated to a purpose. The user may not have a purpose for a particular financial position or investment strategy. For example, the user may want to evaluate Ghirardelli 225, which is in the advisor pool 252, for a period of time before she allocates it to a purpose pool.

Figure 3:
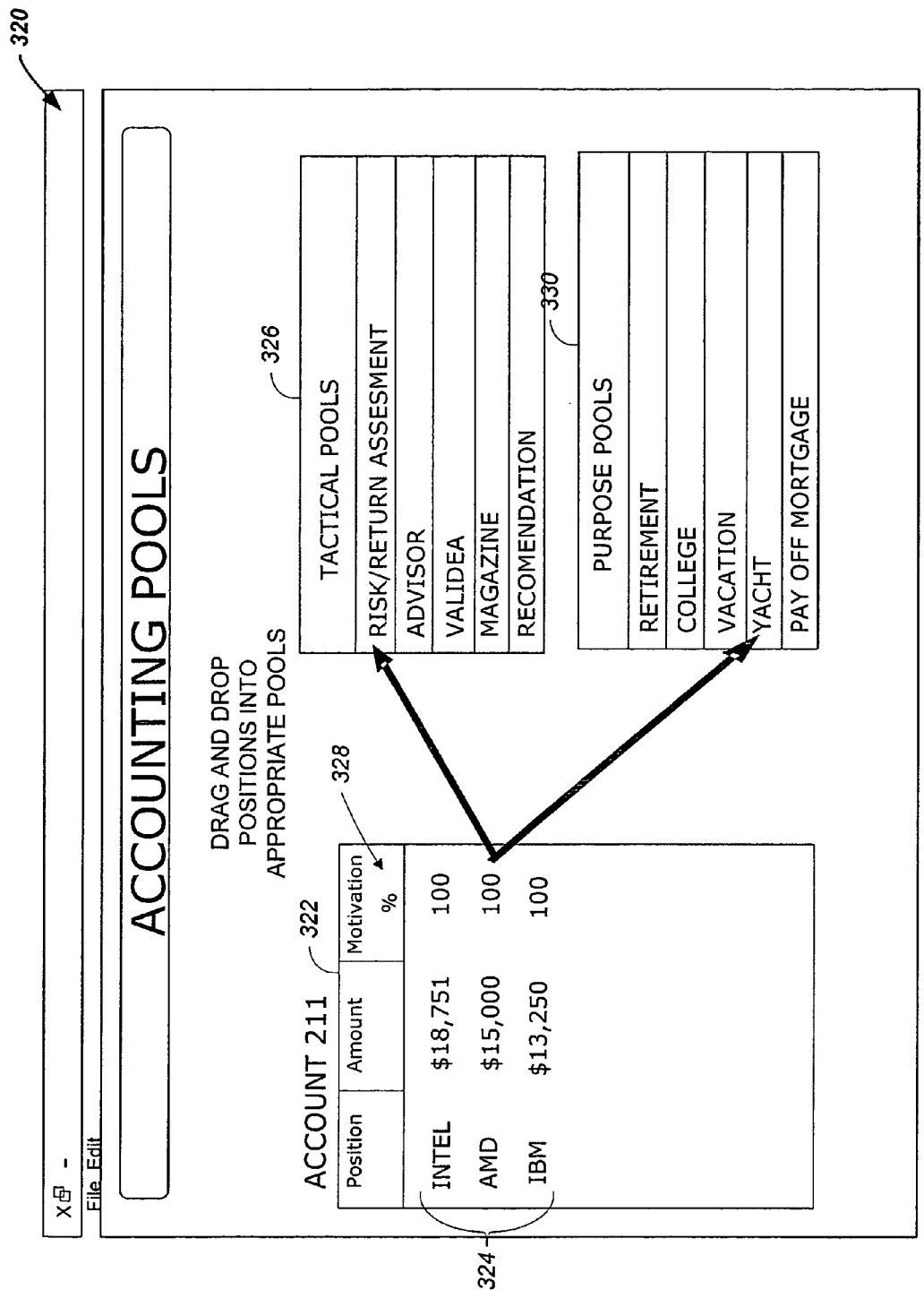
FIG. 3 is an interface for allocating financial purposes.

An example interface 320 for designating a tactical pool and a purpose pool is illustrated in FIG. 3. An account pull-down menu 322 may be used to select an account. The position listing 324 lists the financial positions held in an account. An user may select a financial position and designate a tactical pool by using tactical menu 326. Because entities typically always have a reason for investing, when a new account or financial position is introduced to system 10, tactical menu 326 may open and prompt the investor to select a tactical pool for the financial position. In the example of FIG. 3, position listing 324 also includes a motivation column 328. Motivation column 328 may be used to distribute a particular financial position to two or more tactical pools. For example, an user may have derived her strategy from an advisor and a magazine pick. Additionally this interface will provide the user with the ability to create a new previously unnamed tactical and/or purpose pools.

The user also has the option of assigning positions to purpose pools. This can be done after assigning to strategy pools or can be done prior to or in the absence of creating any tactical pools. A purpose menu 330 is available and prompts a user to designate a purpose for the financial position. If the user desires to designate a purpose at a later time, she may use the purpose menu 330 at any time to designate a purpose or change a purpose.

Interface 320 is not limited to the above configurations. A variety of interfaces may be provided at different times so that an user may allocate or change allocations of a financial position to a tactical pool or purpose pool. For example, an additional column may be added to the position listing 324 that corresponds to the number of shares or percentage of a stock, CD, or mutual fund to a particular tactical pool and/or purpose pool. Additional interfaces for creating and evaluating pools are further described with reference to FIGS. 4A-Z.

Figure 2J:
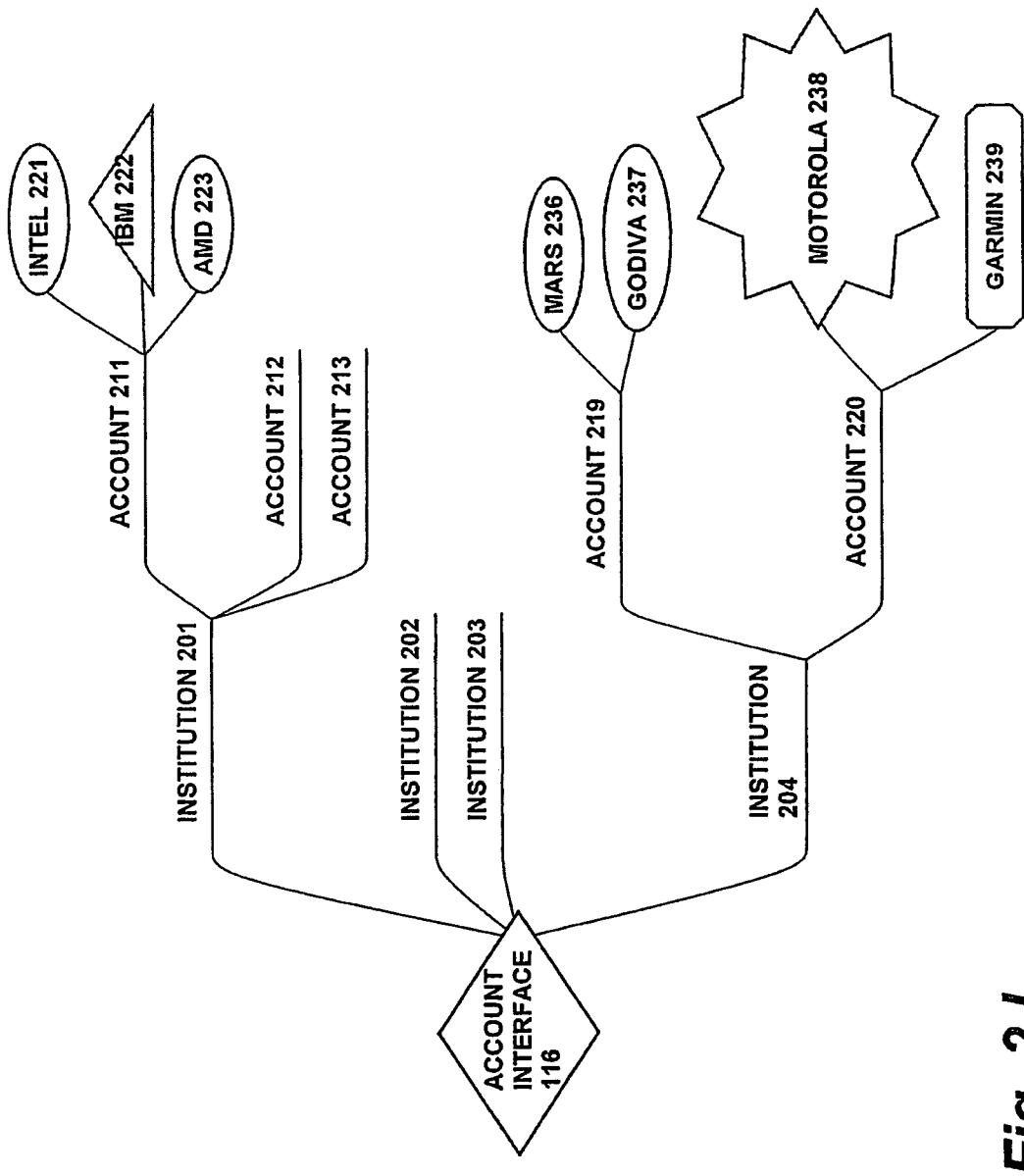

Turning now to FIG. 2J, the user has acquired accounts 219 and 220 at a new institution 204. The user has had Garmin 239 stock recommended to him, she believes that "chocolate" stocks 236 and 237 are going to continue to be in demand, and her financial advisor has recommended Motorola 238 as a good long term investment. Additionally, the Validea tactical pool 253 has been successful; consequently, she would like to re-allocate IBM 222 to the Validea tactical pool 253.

Figure 2K:
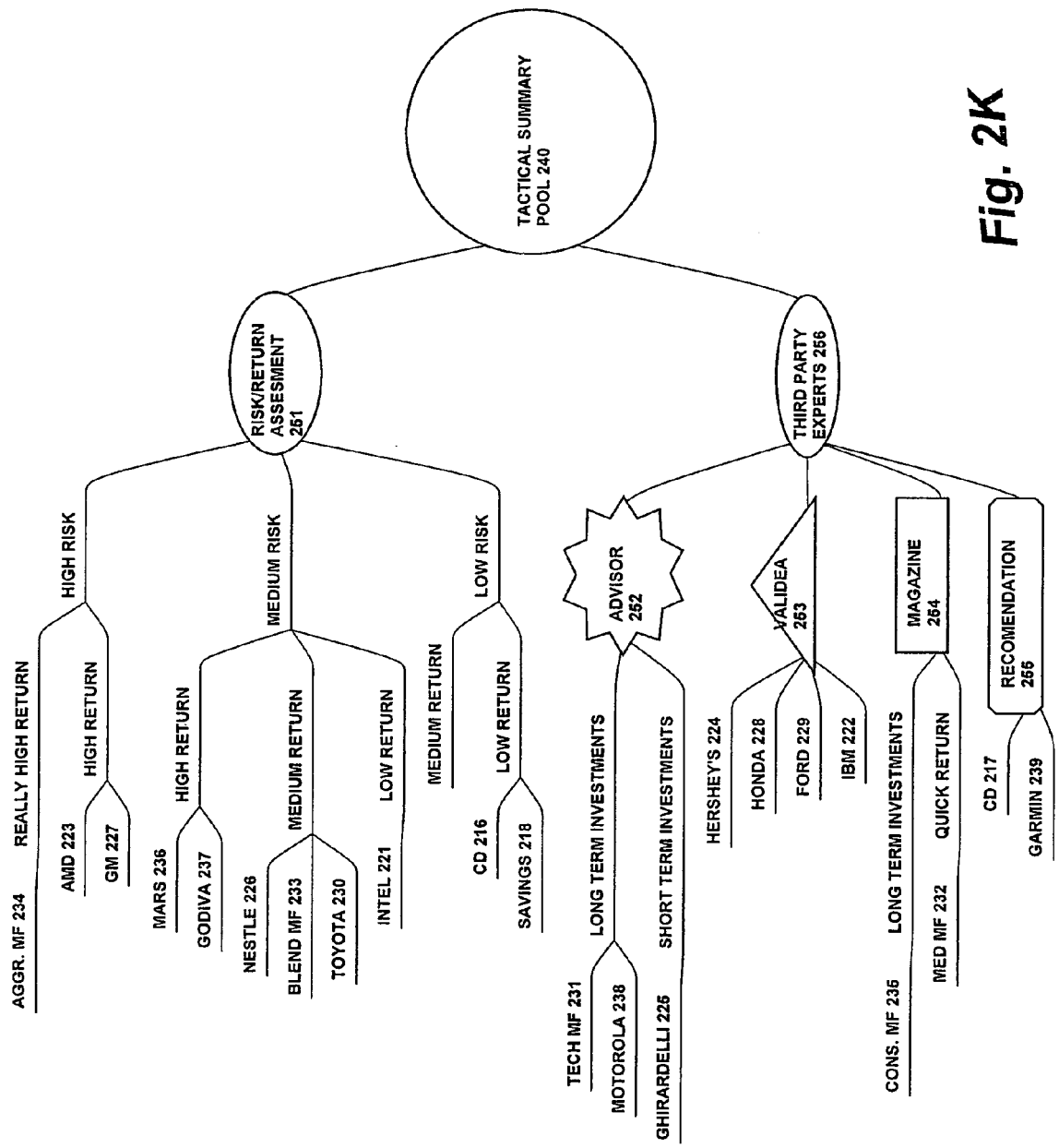

FIG. 2K illustrates the new distribution of financial positions within tactical pools 251-255. The user has allocated new financial positions to tactical pools and has also re-distributed some of her existing financial positions. By viewing the tactical pools, the user may easily recollect her investment strategy. Additionally, financial positions are not restricted to a limited set of tactical pools. New tactical pools may be created and, as described above, a financial position may be distributed to more than one financial pool. A percentage of shares may be distributed to two or more tactical pools.

Figure 2L:
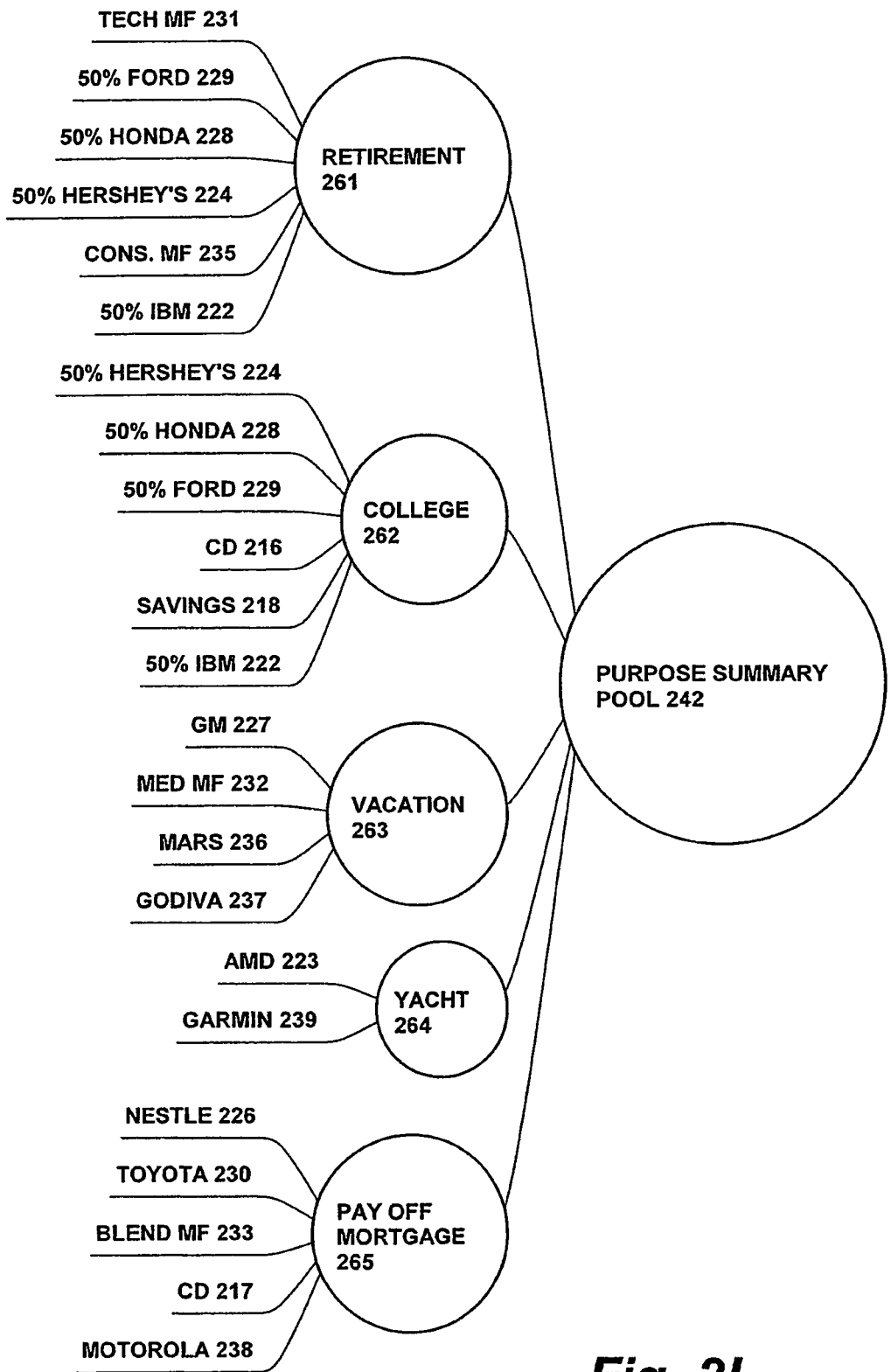

The user may also re-assess her purpose pools. In FIG. 2L, because of poor performance, the user has removed the aggressive mutual fund 234 from the yacht purpose pool 264. She has placed Garmin 239 in its stead, which she hopes will offset losses due to the aggressive mutual fund 264. She has also re-distributed IBM 222 to her retirement 261 and college 262 purpose pools. In IBM's 222 place, she has placed Mars 236 and Godiva 237. Motorola 238 has been placed in the payoff mortgage tactical pool 265 in order to accelerate her early mortgage payoff life goal.

Figure 2M:
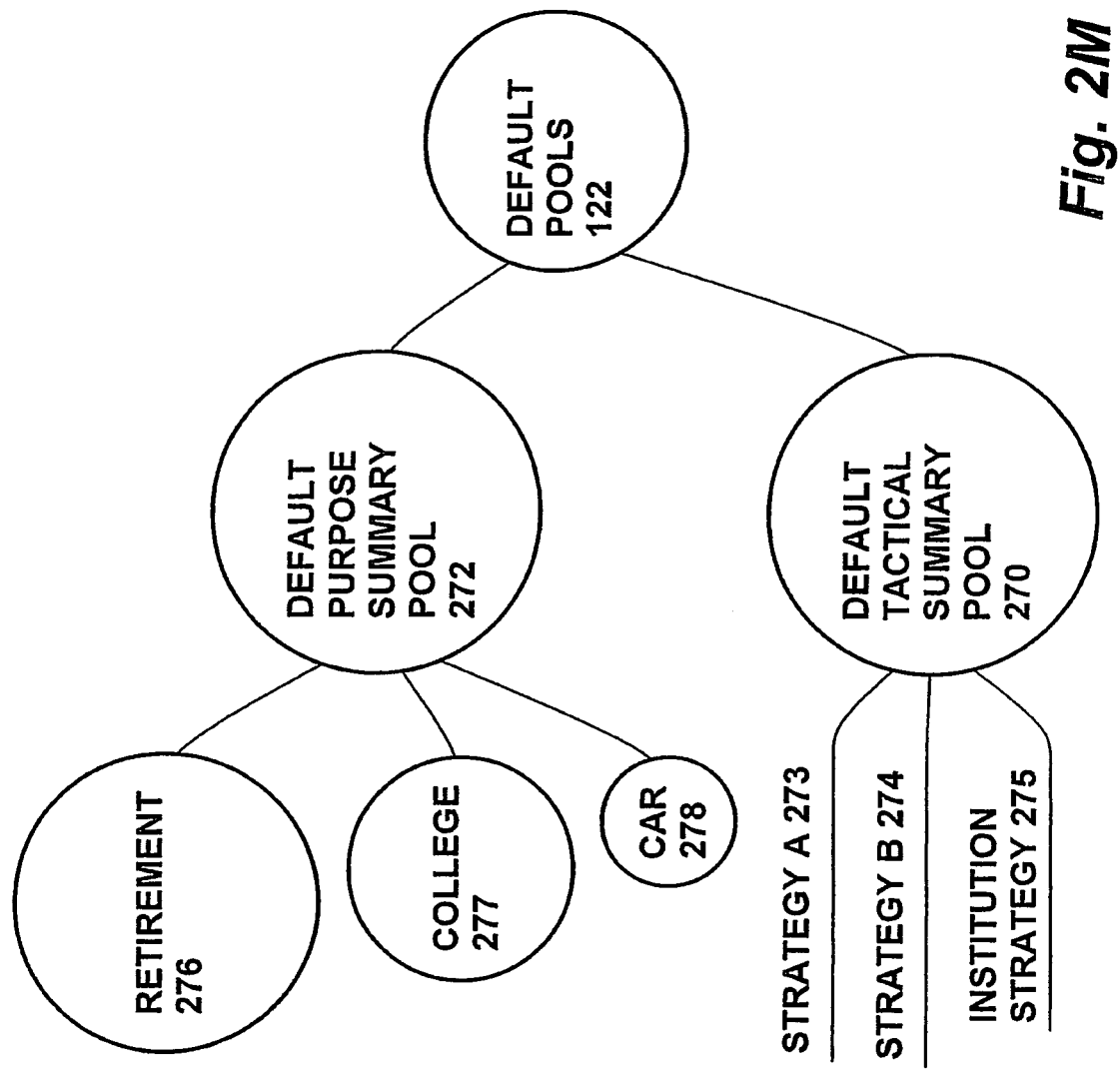

If the user is not very experienced or would like suggestions at to the tactical pool that she should invest in, she may also use the default pools 32 feature of system 10. FIG. 2M illustrates default tactical 270 and purpose 272 summary pools. Default tactical summary pool 270 contains investment strategies A 273 and B 274, as well as institution strategy 275. Default purpose summary pool 272 contains generic retirement 276, college 277, and car 278 purpose pools.

The investment strategy A 273 and B 274 tactical pools may be investment philosophies that an user can evaluate. If an user chooses to, she may optimize or incorporate them into tactical pool summary 240. An institution may also have a default tactical pool associated with the financial positions it has. For example, institution 202 may offer tactical pools associated with the mutual funds it offers.

The generic pools contained in the default purpose summary pool 272 may have generic life goals that can be adapted to an user's interests. For example, the car purpose pool 278 may be adapted to the type of car that the user would like to purchase. An user may be prompted, via a default interface, to enter information into the car purpose pool 278 such as down payment, anticipated monthly car and insurance payments, etc.

The reports 34 functionality is used to evaluate tactical pools and/or purpose pools. The user may use reports 34 to gauge if an investment strategy or life goal is on target. For example, reports 34 may generate a report for the third party expert pool 256 described above. Periodically the user would be understanding at multiple levels if the third party experts she picked were effective as a group and each on their own. This would be especially effective when the user can look back over a period of years and see the aggregate result that tracks the good and bad, expired and current tactics bundled as a higher level tactic. Another report may be generated to track the Validea 253 tactical pool. The generated reports may be customized to display pertinent information that the user would like to track. In one embodiment, the report may be updated as often as the user would like. A variety of information related to all of the purpose and tactical pools may be gathered and generated for the user.

Another interface that is included in the example of FIG. 2A is institution interface 28. This interface allows an institution, such as a bank or a securities company, to assess the financial positions that it offers its customers. The system 10 may be configured so that it allows an institution to evaluate financial positions against purpose pools, for example. The user may inform the institution that a purpose pool is designated for a college fund by an electronic survey, for example. Alternatively, the user may use generic college purpose pool 277. In both of these examples, the institution may be able to survey the success of all its financial positions that have been directed to college fund purposes for some or all of its customers.

The institution may also evaluate its investment strategy by tactical pools. For example, the institution may be able to evaluate how many investors have successfully used their investment strategy by surveying the customers using institution tactical pool 275. A variety of statistics related to both purpose pools and tactical for a limited set or expanded set of customers and investors may be achieved using the institution interface 28. Example reports that may be generated by an institution related to purpose and tactical pools will be further described with reference to FIGS. 5A-X.

A Preferred Interface for Creating and Evaluating Pools

FIG. 4A shows a modified version of a typical prior art screen display 4100 that an investor might see when logging into a computerized investment account, such as an online account with an electronic trading company. The display 4100 is a traditional portfolio view for one of the investor's accounts 4102 (the account named "Account #844"). A traditional portfolio grid 4104 shows the position, number of shares, price, value of the holding, cost of the holding, and gain/loss and may present additional options such as trading the holding or viewing a chart of the holding.

The screen display 4100 has been modified from typical prior art screen displays to include a money pool view button 4106. By pressing this button 4106, the investor may proceed to a different screen display, such as the ones described below.

Figure 4B:
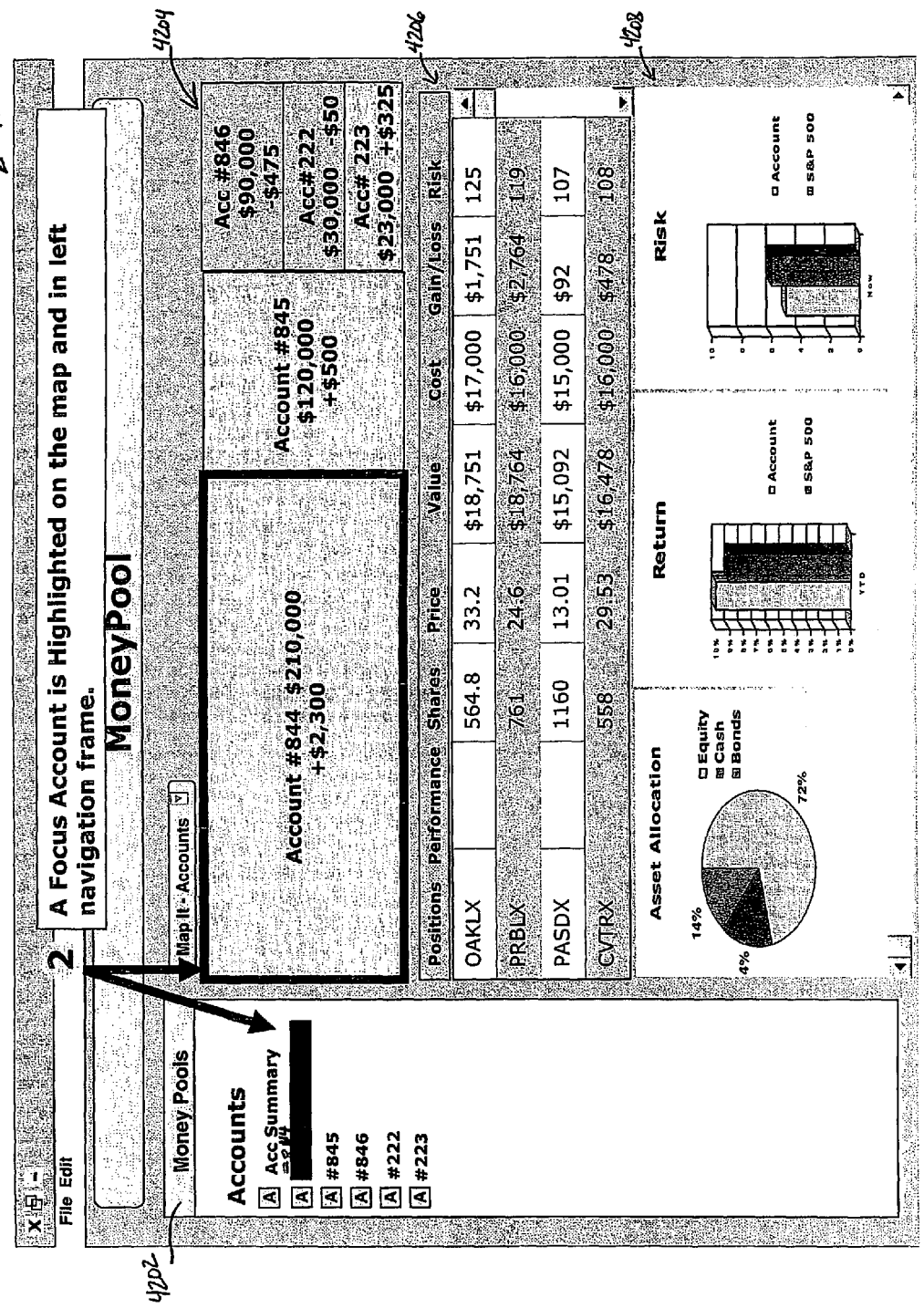

FIG. 4B shows a screen display 4200 that may appear with the investor presses the button 4106 from the portfolio view display 4100. The display 4200 includes four main portions: a money pools listing 4202, an accounts map 4204, an account summary section 4206, and an accounts tool section 4208.

In the example of FIG. 4B, the money pools listing 4202 shows only pools corresponding to accounts. Accounts #844, #845, #846, #222, and #223 are shown in the money pools listing 4202. As described above, these accounts may be maintained at or by one or more financial institutions. For example, accounts #844, #845, and #846 may be maintained by one financial institution, while accounts #222 and #223 may be maintained by a completely separate, unrelated financial institution. In the example shown, account #844 has been highlighted, so that other portions of the screen display 4200 include information corresponding to account #844.

The accounts map 4204 shows a graphical representation of the relative values of various pools, which are account values in the example shown. Account #844 is the largest account, with a current value of $210,000 and a gain (e.g. daily gain) of $2,300. Account #845 has a value of $120,000, with a gain of $500. Accounts #846, #222, and #223 have respective values of $90,000, $30,000, and $23,000. While account #223 has a gain of $325, accounts #846 and #222 have losses of $475 and $50, respectively. The accounts map 4204 can be color-coded to show gains versus losses graphically. For example gains could be displayed in shades of green (with darker shades corresponding to higher gains), while losses could be displayed in shades of red. Gains and losses could be determined based on a variety of time bases or by reference to the price at which positions were purchased, for example. Note that account #844 is highlighted by a bold frame because it is selected in the money pools listing 4202.

The account summary section 4206 shows the financial positions held in account #844. The information presented in the example shown includes position, performance, number of shares, price, value, cost, gain/loss, and risk. Risk may be an attribute assigned by the financial institution maintaining the account, for example. Other risk assignment techniques may alternatively be utilized. Such as an investor's perceived risk/return assessment as described with reference to FIGS. 2D and 2E.

The account tools section 4208 allows a variety of analysis tools to be presented to the viewer of the screen display 4200. In the example shown, graphs corresponding to asset allocation, return, and risk are presented. Other examples of tools include trading gains (or losses), dividends and/or interest, and transfers into or out of the pool shown. In the example of FIG. 4B, tools for account #844 are illustrated. These analysis tools may be generated by the reports 34 functionality of system 10.

Figure 4C:
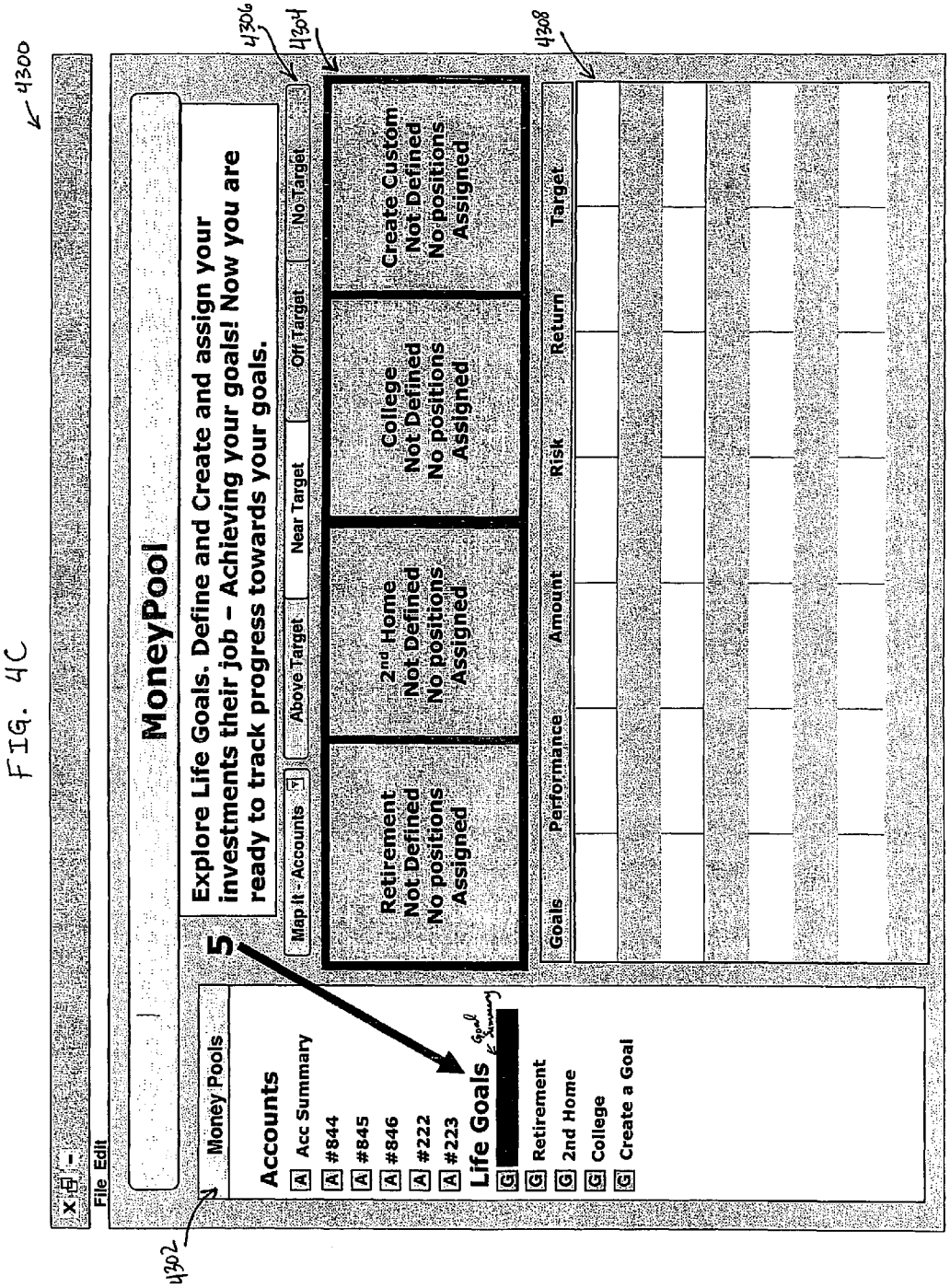

FIG. 4C shows a screen display 4300 with life goals functionality. The life goals correspond to the purpose pools that an investor has setup. The screen display 4300 includes a money pools listing 4302, a pools map 4304, a pools map legend 4306, and a pools summary 4308. In the example shown, the user has not yet defined any life goals, so most of the fields are unpopulated and the default purpose pools are displayed.

The money pools listing 4302 shows accounts (see FIG. 4B) and life goals. Since no life goals have been defined in the example of FIG. 4C, the listing 4302 includes selections corresponding to a "Goal Summary", three sample goals, and a "Create a Goal" option.

Since the "Goal Summary" selection is highlighted in the listing 4302, the pools map 4304 shows the three sample goals and the "Create a Goal" option in the summary. The pools map legend 4306 is shown directly above the pools map 4304. The pools summary is shown directly below the pools map 4304. The layout shown in FIG. 4C is merely one of many possible layouts that may be used to provide life goals functionality in a money pools system.

FIG. 4D shows a screen display 4400 in which a life goal pool is being created by a user. The screen display 4400 includes a money pools listing 4402, a pools map 4404, a pools map legend 4406, and a pool creation form 4408. In the example shown, the user has highlighted "college" as the life goal to be created (see the pools listing 4402 and the pools map 4404).

To create a college pool, the user enters relevant information, such as the year college money is needed (in this case, the year 2018), the annual amount of money likely to be needed (in this case, $40,000), and the total number of years for which the annual amounts are to be paid out (in this case, four years). In this example, "college" is presented as a predefined goal, for which the parameters (years, amounts, etc.) are predetermined, so that the user simply fills in the blanks to match the user's particular circumstance. "Retirement" and "$2^{nd}$ Home" are two other predefined goals illustrated in the example of FIG. 4D. These predefined goals may be established in the default purpose pools. Additional predefined goals could also be provided. The user may also create a new goal, as shown by the "Create a Goal" selection in the money pools listing 4402. Alternatively, the investor may want to customize a predefined goal.

Figure 4E:
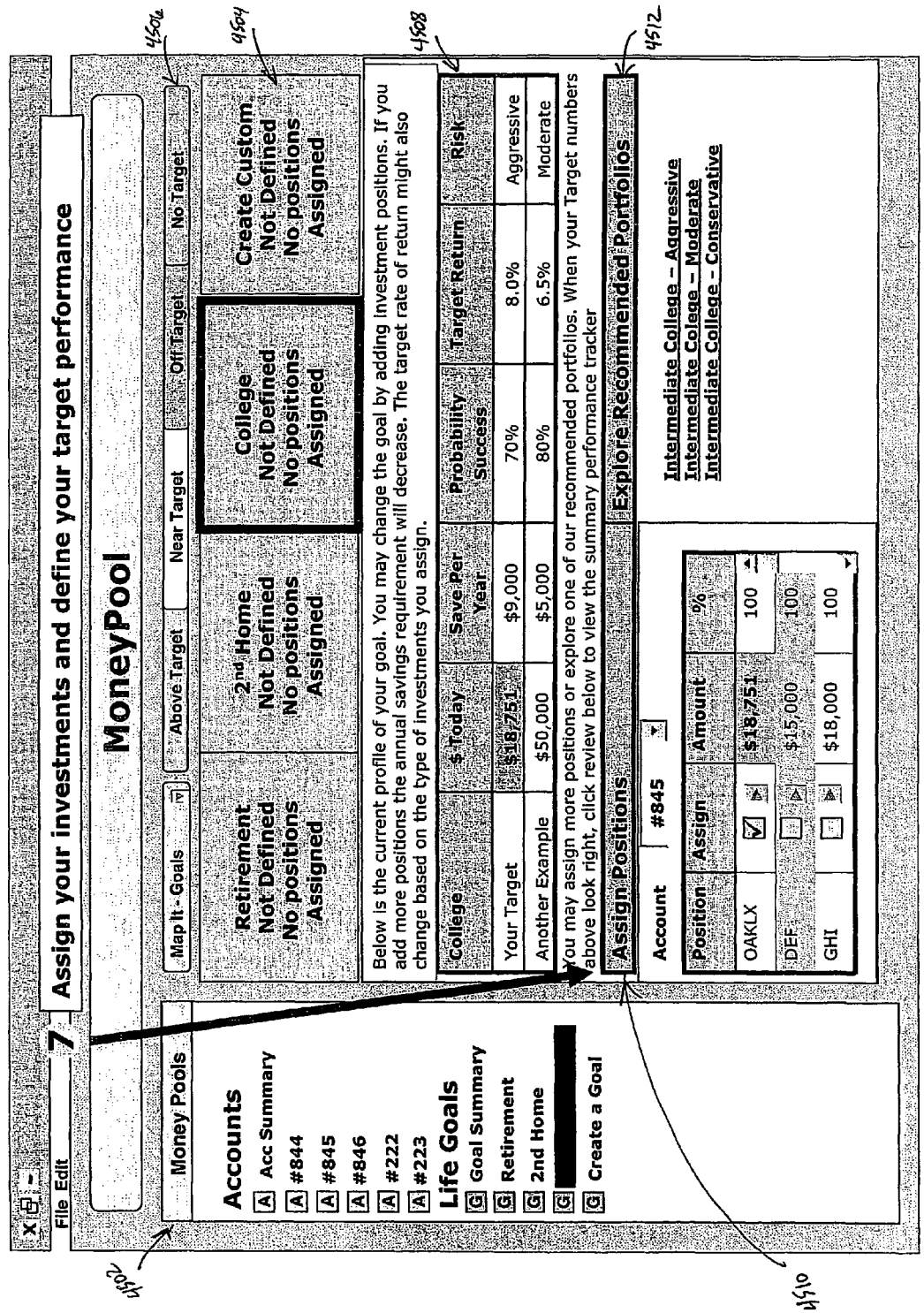

FIG. 4E shows a screen display 4500 in which a user has created a "college" money pool (see FIG. 4D) and is now assigning investments to that money pool. The screen display 4500 includes a money pools listing 4502, a pools map 4504, a pools map legend 4506, a pool profile 4508, a pool assignment form 4510, and a recommended approaches portion 4512. The money pools listing 4502, pools map 4504, and pools map legend 4506 are similar or identical to similar elements described with reference to earlier FIGS. 4C and 4D.

The pool profile 4508 provides a snapshot of the pool created in FIG. 4D. In this example, the pool profile 4508 lists a target amount, the recommended amount to save per year, the probability of success, a target rate of return, and a risk designation. Some of these parameters might be assigned by the user, while others might be provided by the financial institution or another third-party service. For example, a financial institution might maintain a risk rating system in which an aggressive, moderate, or conservative rating is assigned to every available investment. As another example, the user might predict a probable rate of return for a position, based on perceived trends in interest rates, etc.

The pool assignment form 4510 allows the user to choose positions to assign to a particular pool. In the example of FIG. 4E, the college money pool is active, so the user can assign to the college pool one or more financial positions from one or more accounts (maintained by one or more financial institutions). Here, the user has selected 100% of a position with a ticker symbol "OAKLX" from the user's account #845, which corresponds to a value of $18,751. This amount is also reflected in the pool profile 4508. If the user were to assign additional positions having positive values, they would also be shown in the pool profile 4508, and would reduce the required savings per year.

The recommended approaches portion 4512 can be implemented to provide the user with a choice of predetermined money pools that have been determined to be appropriate for funding a college education. For example, a financial institution employing the money pools system of the present application might track user tendencies and notice that many users assign blue-chip mutual funds to college education money pools. If those assignments have been historically successful in achieving life goals that correspond to college, the recommended approaches might include blue-chip mutual funds. This could be done automatically or manually, or a combination of the two.

FIG. 4F shows a screen display 4600 for tracking life goals. The display 4600 includes four main portions: a money pools listing 4602, a goals map 4604, a goal summary section 4606, and a goals tool section 4608.

The money pools listing 4602 shows various accounts and life goals as the pools being tracked. Because "college" is highlighted in the money pools listing 4602, the other portions of the display 4600 relate to the college money pool.

The goals map 4604 illustrates the user's investments that are assigned to goals. In this example, only the college goal has been created, with the rest of the user's investments being unassigned. A goals legend 4610 can be included to provide color-based tracking of whether or not the user is on track to meet defined goals.

The goal summary section 4606 shows positions assigned to the college goal. In this example, the user has assigned positions OAKLX and CVTRX and $8,000 in cash to the college goal. These positions are from two different accounts (#844 and #845). Other information that can be provided in the goal summary section 4606 includes performance (e.g. a color coded grading system), amount, risk, and investment strategies (see discussion below). Risk and performance can be determined by the money pools system, such as by analyzing historical and present returns, or through a third party service.

The goals tool section 4608 includes a number of graphs that may be useful to the user in evaluating progress toward the goal. The graphs illustrated in this example include total assets, savings, return, and risk. Other tools for tracking and/or evaluating goals may also be provided.

Figure 4G:
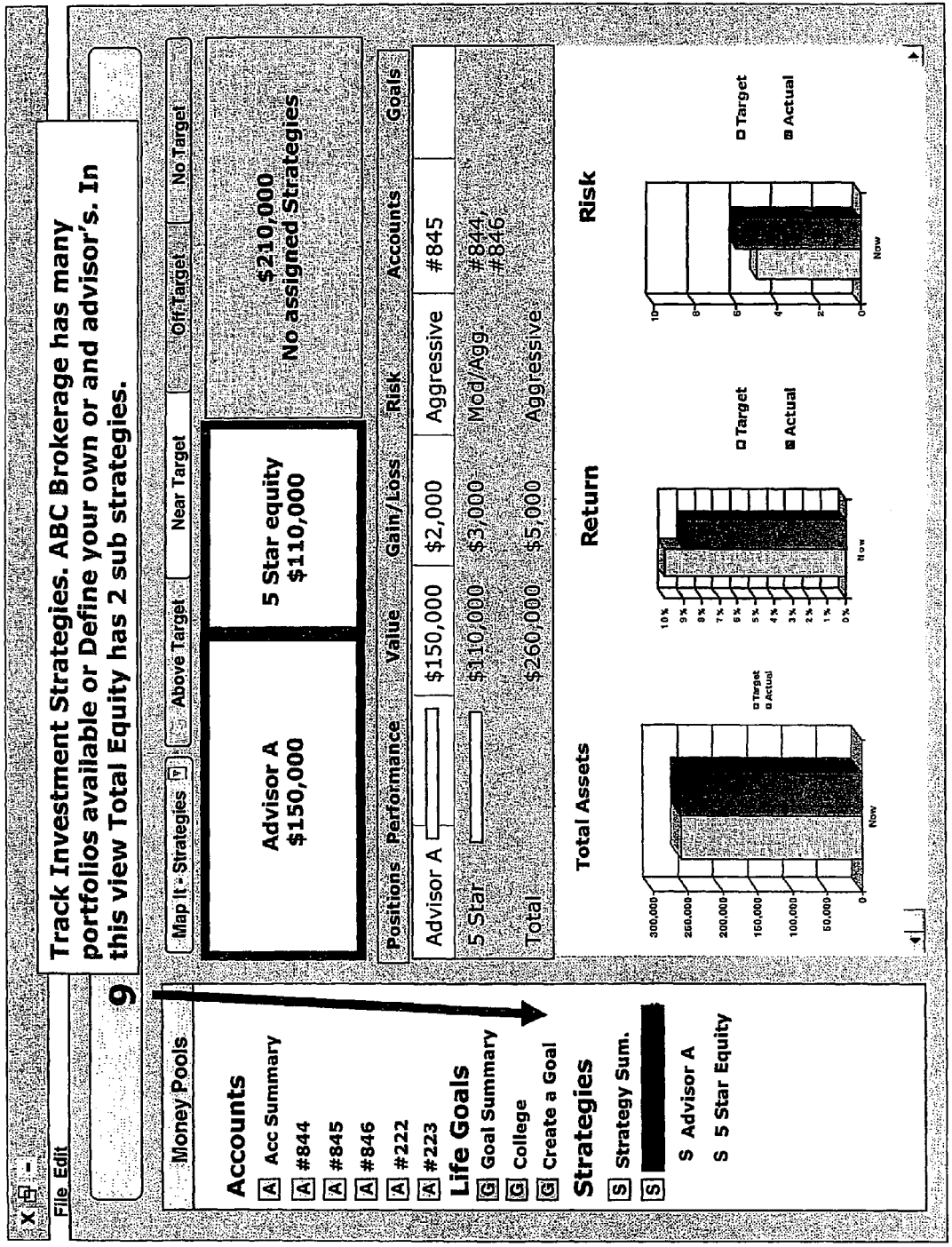
Figure 4H:
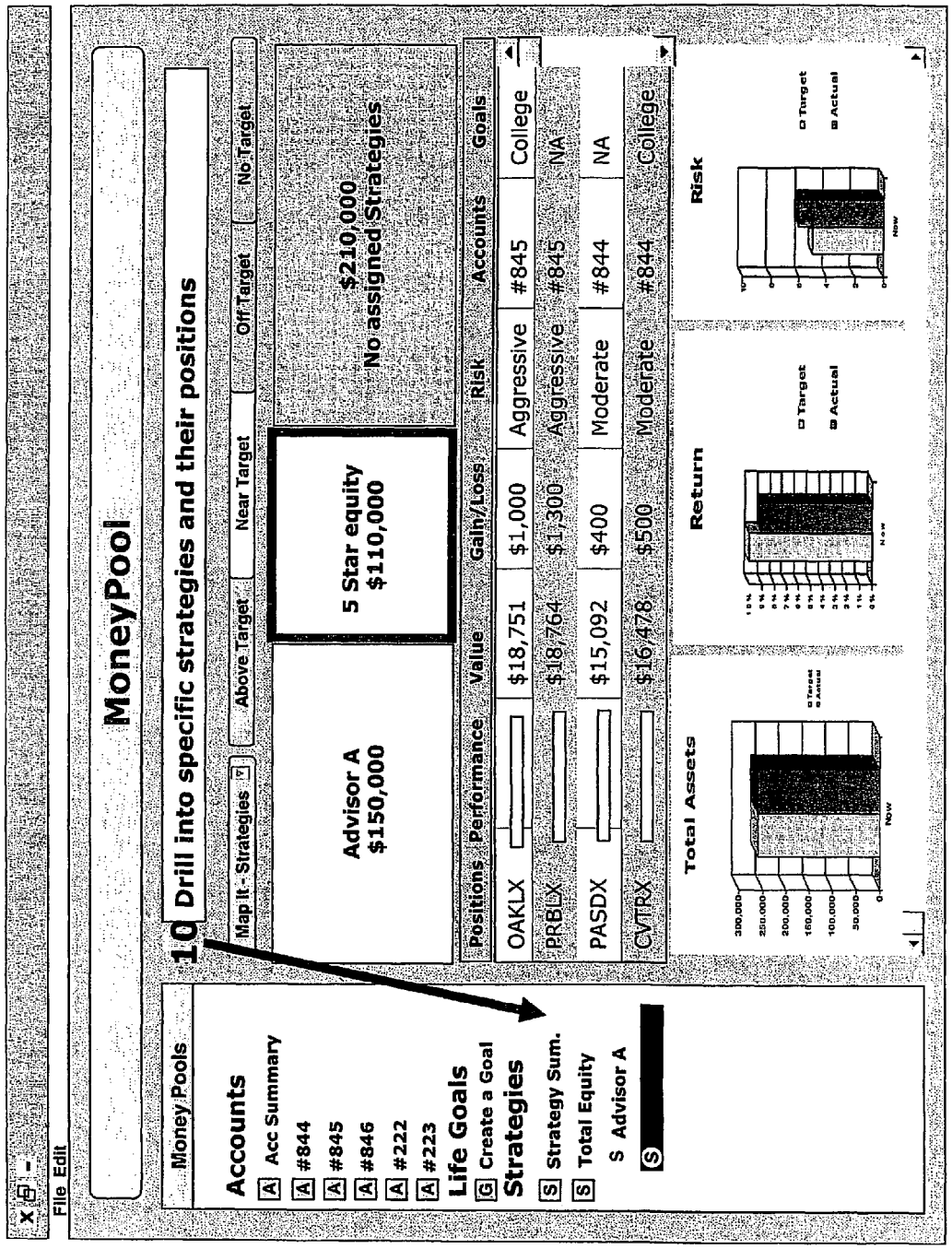
Figure 4I:
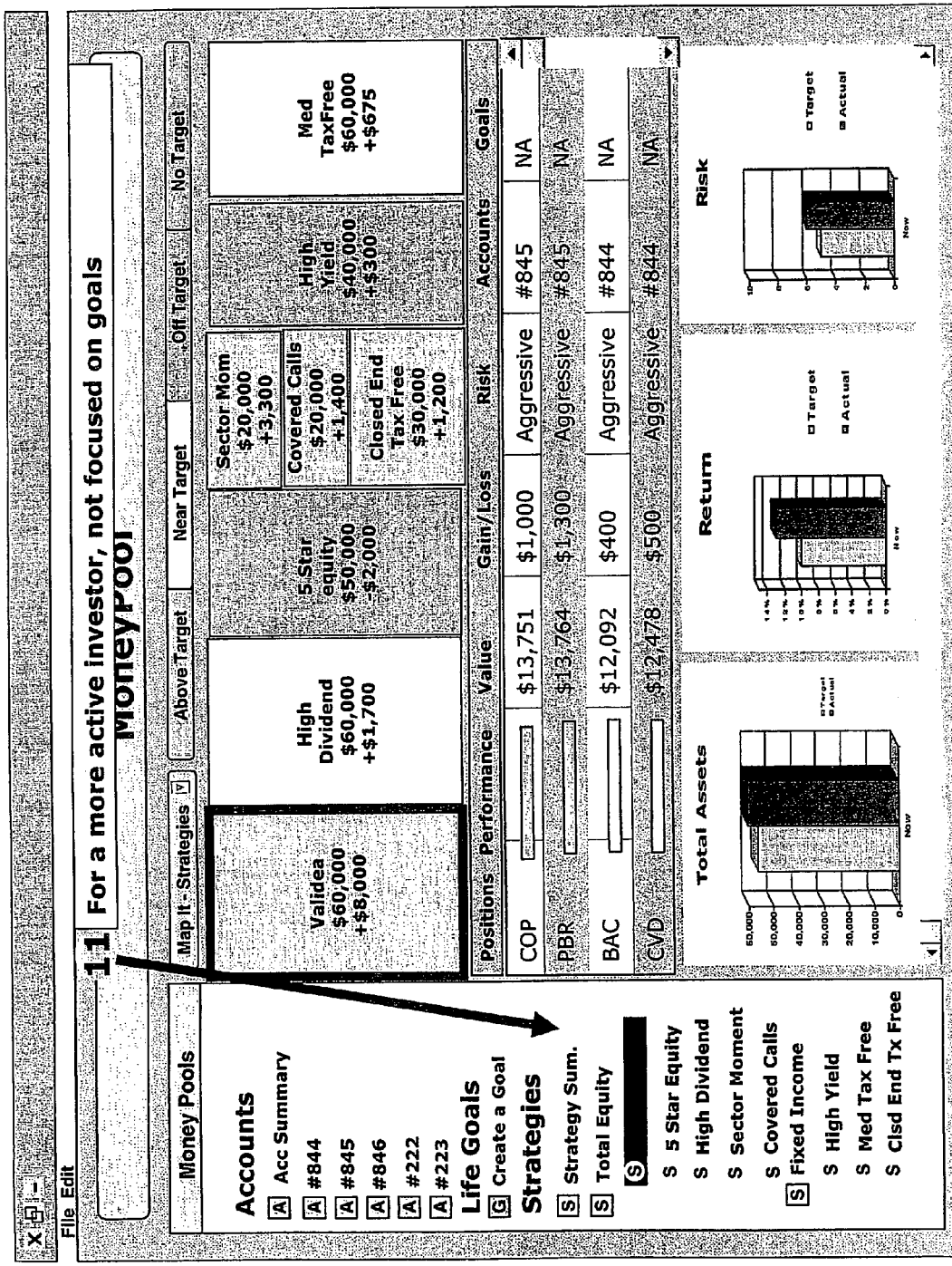

The user interface illustrated in FIGS. 4A-4F may also include functionality to allow tracking of investment strategies, as shown in FIGS. 4G-4I. For example, the tactical pool concepts described with reference to FIGS. 2A-2M may be presented graphically using the interface shown in FIGS. 4G-4I. FIG. 4G illustrates two strategies that have been used for a portion of the investor's assets (e.g. a little over half of the assets are assigned to either "Advisor A" or "5-Star Equity." FIG. 4G also shows how positions may be assigned to both goal and tactic/strategy pools (e.g. the position OAKLX is assigned to a college pool and a 5-Star Equity strategy pool). FIG. 4H illustrates how a user may drill down to see individual positions in a particular strategic pool. FIG. 4I shows a more complex pool strategy. In a preferred embodiment, the user interface of the present invention also presents the user with performance information, such as gain/loss data, relative risk levels, and others.

A Preferred Interface for Tracking Pool Performance by an Institution

Figure 5C:
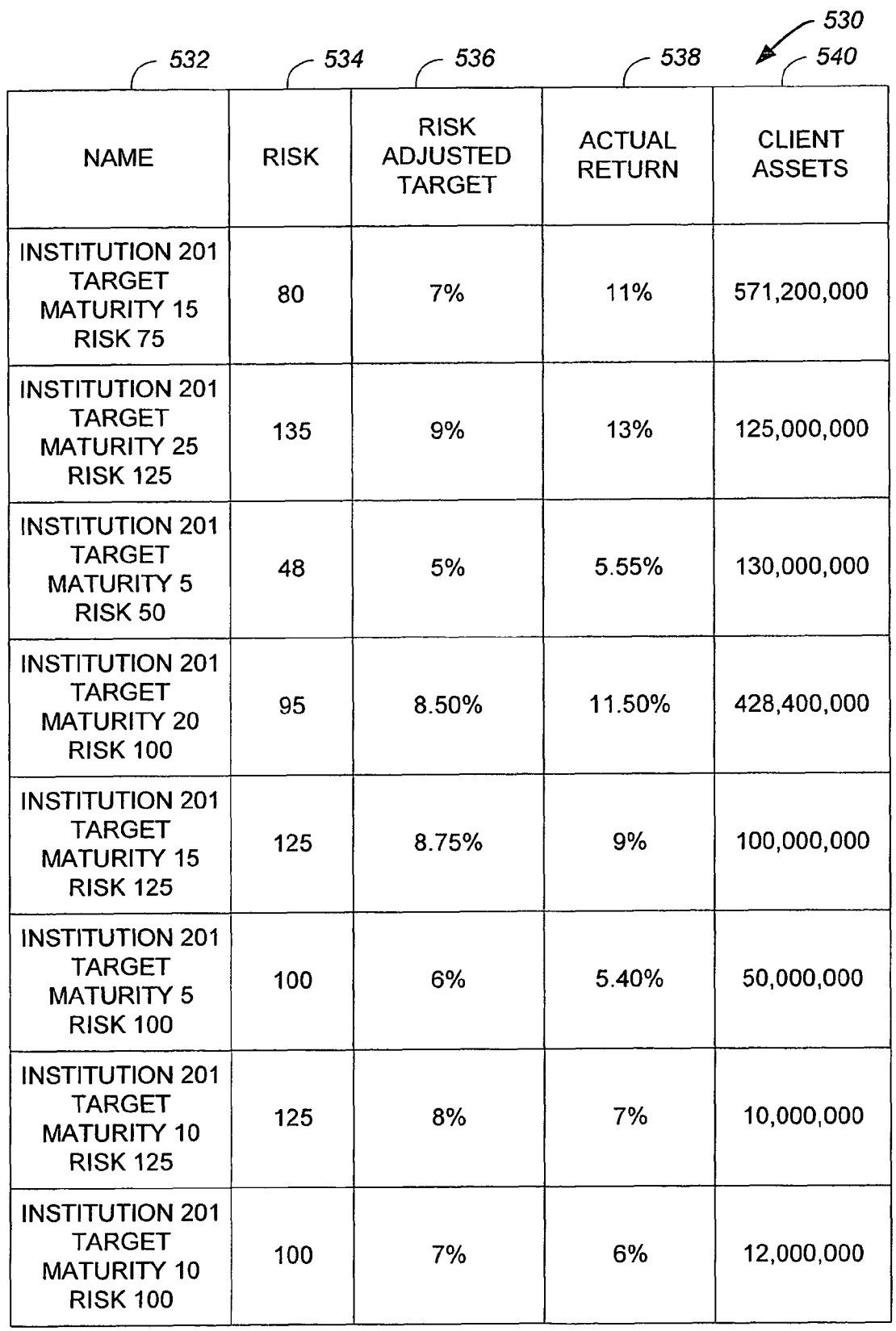

Using system 10, a variety of reports may be generated by a financial institution or a third party via the institution interface 28. These reports include an assortment of statistics relating to a diversity of investors. The reports are generally directed to a number of investors and not one particular investor. Additionally, the reports may be used as a survey to gauge statistics related to investor profile, investment strategy and/or investment portfolio, for example. The investor profile statistics may include statistics relating to age, location, or net assets. The investment strategy statistics may contain statistics related to a variety of investment philosophies including how many investors are using pool based accounting. The investment portfolio statistics may, include the most common financial positions that investors at a particular institution hold. Various example statistics that may be used in reports generated by an institution are as follows:

clients, # client accounts, # clients with more than "x" accounts
clients using accounting pools
clients % coverage of financial positions with tactical pools
clients % coverage of financial positions with purpose pools
survey of tactical pools being used and their type
list of advisor tactical pool
list of purpose pools being used
asset size of purpose pools
% of purpose pools using a financial institution's product or advisor
% of tactical pools using a financial institution's product, advisor, 3$^{rd}$ party partners, custom pools, or std
% breakdown of tactical pools and purpose pools in various risk/grade ranges FIG. 5A illustrates an example report 500 that a financial institution or a third party may generate using system 10. Ten different reports are generated, each identified in column 502. Each report may reflect statistics related to a subset, or sampling, of clients. A subset may relate to a variety of samplings such as account types, the length of time a client has had an account, or an age range of clients, for example. The number of clients within each subset is identified in column 504. The total amount of assets of the subset is identified in column 506. Statistics relating to the percentage of accounts using tactical pools, the number of accounts using purpose pools, the amount of money in purpose pools, and the number of accounts using both tactical and purpose pools are contained in respective columns 508, 510, 512, and 514.

Another example report 516 is illustrated in FIG. 5B. Example report 516 displays statistics related to the investment strategies of at least one financial institution's clients. Columns 518, 520, and 522 respectively display the amount of assets the subsets of clients have allocated the investment strategies (tactical pools) institution 201 offers. Column 524 displays the amount of assets allocated to a particular advisor's strategy. Column 526 displays assets allocated to an investment strategy associated with another institution 526.

The report 516 may also include specialized asset allocations, such as financial positions yielding high dividends, as is shown in column 528.

A financial institution may also use the investor interface 28 of system 10 to evaluate the investment strategies (tactical pools) they offer. For example, report 530 contains investment strategies, the risk associated with each strategy, the adjusted target, the actual return, and the assets allocated to a particular strategy in respective columns 532, 534, 536, 538, and 540. The financial institution may also use report 530 to evaluate other default tactical pools that may have been set up using the default pools 32 function.

Figure 5D:
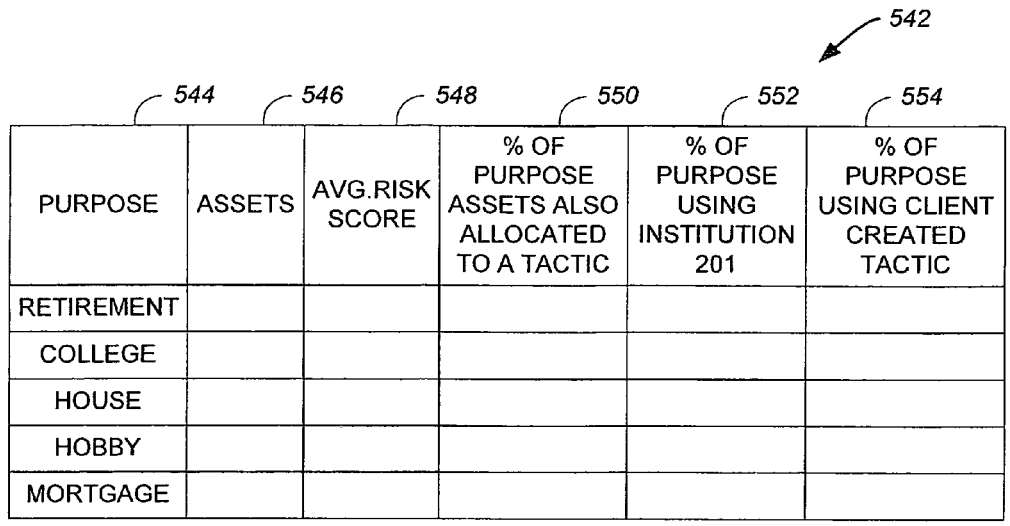

The financial institution or other third party may compile reports bases on the purpose pools that a sample of investors use. Example report 542, in FIG. 5D, illustrates purpose pools (representative of a sample of investors) that may be tracked against assets allocated to a purpose pool, an average risk score associated with the purpose pool, a percentage of the purpose pool's assets allocated to a particular tactical pool, the percentage of the purpose pools using a particular institution, and the percentage of purpose pools using a client created tactical pool in respective columns 544, 546, 548, 550, 552, and 554.

Figure 5E:
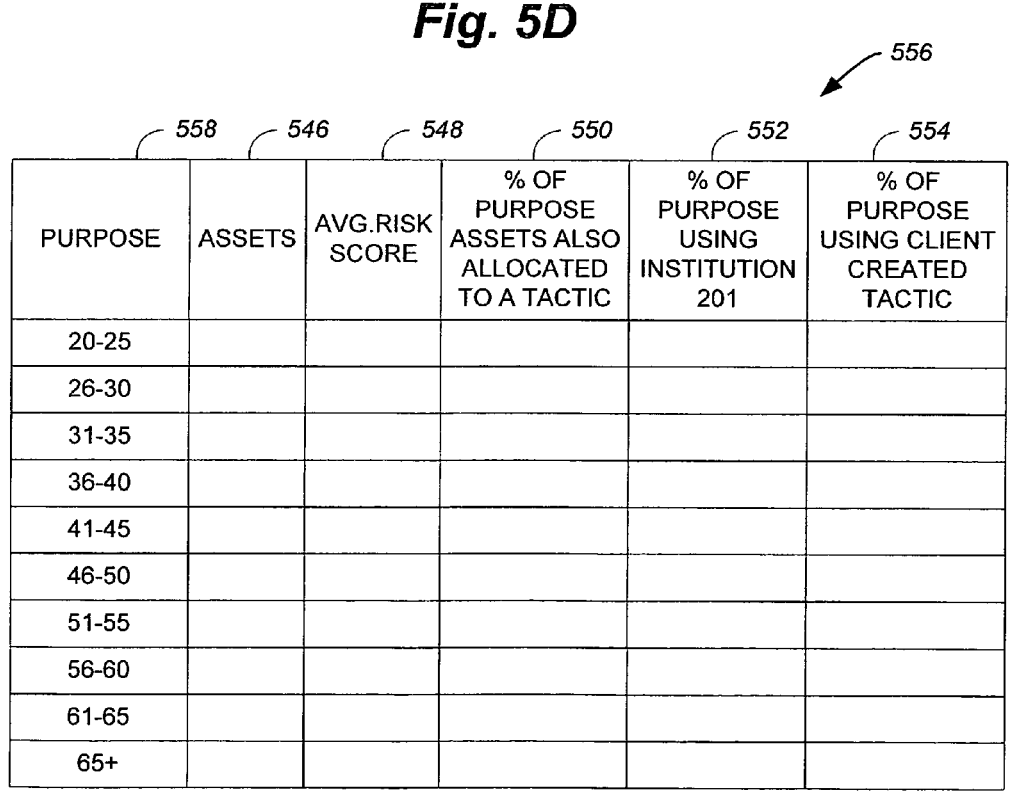

Report 542 may be further refined to create report 556 as shown in FIG. 5E. In report 556, a particular purpose pool, such as retirement, may be evaluated across variety of age brackets as is shown in column 558. Alternatively, report 556 could reflect age brackets associated with a selection of purpose pools.

The use of the institution interface 28, along with the report functionality, allows many different types of statistical data to be gathered and evaluated. This data may be valuable to an institution to evaluate their own investment strategies, to develop new investment strategies, and to realize investment trends.

Overall, the above examples and embodiments describe a system and a method of operating a money pools system. It should be understood that the illustrated examples are examples only and should not be taken as limiting the scope of the present invention. For example, more or fewer elements or components may be used in the block diagrams. In addition, the present invention can be practiced with hardware or a combination of software and hardware. Described software tools such as buttons, pull-down menus, links, and other user-interface tools may be substituted for other tools. The claims should not be read as limited to the described order or elements unless stated to that effect. Therefore, all examples and embodiments that come within the scope and spirit of the following claims and equivalents thereto are claimed as the invention.

We claim:

1. A computer-implemented method for allocating money pools comprising:
storing, on computer readable storage media, a plurality of financial account positions, wherein each of the plurality of financial account positions represents a position held in a corresponding account in a single financial institution, so that the plurality of financial account positions is held in one or more accounts;
allocating, via an allocation director implemented on at least one computing device, a first portion of the plurality of financial account positions to a first money pool located within a first plurality of money pools associated with the first category, said first money pool communicated electronically, via a network, to at least one electronic data base;

allocating, via the allocation director, a second portion of the plurality of financial account positions to a second money pool located within a second plurality of money pools associated with a second category, said second money pool communicated electronically, via the network, to the at least one electronic data base, wherein the second portion shares at least one financial account position with the first portion, and wherein there is at least one financial account position not shared between the first portion and the second portion, whereby the first money pool and the second money pool overlap;

creating a third money pool, via the allocation director, that includes at least two money pools from the first plurality of money pools, wherein the third money pool includes the first money pool, and wherein each money pool within the third money pool shares a third pool reason, said third money pool communicated electronically, via the network, to the at least one electronic data base;

communicating a graphic representation of the first, second and third money pools, via the network, to at least a second computing device for visible display on a display device operatively connected to the at least second computing device.

2. The method of claim 1, further comprising:
creating a fourth money pool, via the allocation director, that includes at least two pools from the second plurality of pools, wherein the fourth money pool includes the second pool, and wherein each pool within the fourth money pool share a fourth pool reason.

3. The method of claim 1, further comprising:
creating a fourth money pool, via the allocation director, that includes a third portion of the plurality of financial account positions, wherein the fourth money pool is a third category.

4. The method of claim 1, wherein the first plurality of financial account positions includes up to 100% of the at least one financial account position.

5. The method of claim 1, further comprising providing pool performance data for at least one of the first pool and the third pool.

6. The method of claim 5, wherein the pool performance data is a type of analysis selected from the group consisting of a rate of return, a risk score, an income, a gain, and a loss.

7. The method of claim 5, wherein providing pool performance data comprises:
storing an initial pool analysis corresponding to a first time; and
determining a relative pool analysis corresponding to a second time.

8. The method of claim 1, wherein each of the plurality of financial account positions has an associated financial position descriptor, unit of measure descriptor, and an associated quantity.

9. The method of claim 8, wherein each of the plurality of financial account positions includes an asset pool of financial instruments selected from the group consisting of a stock, a bond, a mutual fund, an option position, cash, collectables, and real estate holdings.

10. The method of claim 8, wherein the plurality of financial account positions include financial liabilities.

11. The method of claim 8, wherein each of the plurality of financial account positions includes financial instruments that are available publicly and privately.

12. The method of claim 1, wherein the one or more accounts comprises at least two accounts affiliated with different financial institutions.

13. The method of claim 1, wherein the one or more accounts comprises at least two accounts each having a record kept by different financial institutions.

14. The method of claim 1, wherein the computer readable media comprises a database stored on a non-volatile recording medium at a computer network accessible server.

15. The method of claim 1, wherein the first category is selected from the group consisting of a tactic/strategy type, a tax status type, a person/entity type, a purpose/goal type, and a liability.

16. The method of claim 1, wherein the first category is created by a user.

17. The method of claim 1, wherein the first pool has a first pool reason that is determined by a user.

18. The method of claim 1, wherein the first category is associated with a tactic/strategy, and wherein the first pool has a first pool reason that is selected from the group consisting of (a) financial account positions based on the recommendation of a financial advisor, (b) financial account positions based on the recommendation of a publication, and (c) financial account positions based on an financial instrument rating system.

19. The method of claim 1, wherein the first category is associated with a tax status, and wherein the first pool has a first pool reason that is selected from the group consisting of (a) a non-taxable status, (b) a taxable status, and (c) a tax-deferred status.

20. The method of claim 1, wherein the first category is associated with a person/entity, and wherein the first pool has a first pool reason that is selected from the group consisting of (a) a family member, (b) a child, (c) a business, and (d) a household.

21. The method of claim 1, wherein the first category is associated with a purpose/goal, and wherein the first pool has a first pool reason that is selected from the group consisting of (a) targeted for a college expenditure, (b) targeted for a wedding expenditure, and (c) targeted for retirement.

22. The method of claim 1, wherein the first category is associated with a liability, and wherein the first pool has a first pool reason that is selected from the group consisting of (a) a loan, (b) an interest payment, and (c) a financial loss.

23. The method of claim 1, wherein the user populates at least one of the first pool and the second pool with financial account positions.

24. The method of claim 1, wherein at least one of the first pool and the second pool is populated with financial account positions that are determined by a third party.

25. The method of claim 1, wherein the first category is associated with a template that is incorporated at a user's discretion.

26. The method of claim 1, wherein the third pool reason is determined by a user.

27. The method of claim 1, wherein the third pool reason is created by a third party and activated by a user.

28. The method of claim 1, wherein the first pool has an associated first pool reason that is created by a third party and activated by a user.

29. The method of claim 1, further comprising assigning an accessibility level to the first pool, wherein the accessibility level determines a type of access associated with a user.

30. The method of claim 1, further comprising assigning an accessibility level to the third pool, wherein the accessibility level determines a type of access associated with a user.

31. The method of claim 1, further comprising:
creating a fourth money pool, via the allocation director, that includes at least two pools from the first plurality of pools, wherein the fourth money pool includes the third pool, and wherein each pool within the fourth money pool share a fourth pool reason.

32. The method of claim 1, wherein the computer readable media is affiliated with a third party, and wherein the one or more accounts comprises at least one account affiliated with a financial institution that differs from the third party.

33. The method of claim 1, further comprising creating an aspect that allows a user to view at least one pool selected from the first plurality of pools with respect to at least one pool selected from the second plurality of pools via aggregated financial account positions that are common to the first and second plurality of pools.

34. A non-transitory computer readable storage medium comprising computer code that when executed by a processor performs a method for allocating money pools comprising:
   storing a plurality of financial account positions, wherein each of the plurality of financial account positions is held in a corresponding account in a single financial institution, so that the plurality of financial account positions is held in one or more accounts;
   allocating a first portion of the plurality of financial account positions to a first money pool located within a first plurality of money pools associated with a first category, wherein the first portion constitutes a grouping of financial account positions that share a first pool reason, said first money pool communicated electronically, via a network, to at least one electronic data base;
   allocating a second portion of the plurality of financial account positions to a second money pool located within a second plurality of money pools associated with a second category, wherein the second portion constitutes a grouping of financial account positions that share a second pool reason, and wherein there is at least one financial account position not shared between the first portion and the second portion, whereby the first money pool and the second money pool overlap, said second money pool communicated electronically, via the network, to at least one electronic data base; and
   creating a third money pool that includes at least the first money pool and a third portion of the plurality of financial account positions, wherein the third portion of financial account positions are located in the first category and not located in the first money pool, and wherein all of the financial account positions located in the third money pool share a third pool reason, said third money pool communicated electronically, via the network, to the at least one electronic data base;
   deriving at least one of the first money pool, the third money pool, and the first category from a money pool template.

35. The computer readable storage medium of claim 34, further comprising:
   deriving the first category and the second category from the money pool template.

36. The computer readable storage medium of claim 34, further comprising:
   deriving the first, second, and third money pools from the money pool template.

37. The computer readable storage medium of claim 34, wherein the allocation of the at least one of the first money pool and the third money pool occurs upon money pool template activation by a third party.

38. The computer readable storage medium of claim 34, wherein the allocation of the at least one of the first money pool and the third money pool occurs upon money pool template activation by a user.

39. The computer readable storage medium of claim 34, further comprising:
   when a user wants to access the at least one of the first money pool, the third money pool, and the first category, receiving a payment from the user.

40. The computer readable storage medium of claim 39, further comprising:
   monitoring at least one of the plurality of financial account positions with a pool monitor, wherein allocating to the at least one of the first money pool, the second money pool, and the first category is based on the monitoring of the least one of the financial account positions.

41. The computer readable storage medium of claim 39, wherein allocating to the at least one of the first money pool, the third money pool, and the first category is automatically carried out by the pool monitor.

42. The computer readable storage medium of claim 41, wherein the pool monitor is derived from an investment strategy associated with a third party.

43. The computer readable storage medium of claim 34, wherein the money pool template is created by a user and the first portion of the plurality of financial account positions is managed by the user.

44. The computer readable storage medium of claim 34, wherein the money pool template is created by a third party and the first portion of the plurality of financial account positions is managed by a user.

45. The computer readable storage medium of claim 34, wherein the money pool template is created by a third party and the first portion of the plurality of financial account positions is managed by the third party.

46. A computer-implemented method for allocating money pools comprising:
   storing, on computer readable media a plurality of financial account positions held in a single financial institution;
   allocating, via an allocation director implemented on at least one computing device, a first portion of the plurality of financial account positions to a first money pool located within a first plurality of money pools associated with a first category;
   allocating, via the allocation director, a second portion of the plurality of financial account positions to a second money pool located within a second plurality of money pools associated with a second category, and wherein the second portion shares at least one financial account position with the first portion, and wherein there is at least one financial account position not shared between the first portion and the second portion, whereby the first money pool and the second money pool overlap;
   sharing at least one of the first and second money pools with a money pool system network, wherein the at least one of the first and second money pools and the at least one computing device correspond to a first local money pool system, wherein the money pool system network includes a plurality of networked local money pool systems.

47. The method of claim 46, further comprising receiving a subscription fee from a user prior to providing access to the local money pool system network.

48. The method of claim 46, further comprising administering the local money pool system network by a third party.

49. The method of claim 46, further comprising generating performance analysis associated with the local money pool system network, wherein the performance data is associated with at least one of the plurality of networked local money pool systems.

50. The method of claim 46, further comprising: creating a copy of the first money pool as a first money pool template; and distributing the copy of the first money pool template to a second local pool system on the pool system network.

51. The method of claim 50, further comprising collecting a fee for the distribution of the first money pool template.

52. The method of claim 50, wherein the first money pool template is designed by a third party.

53. The method of claim 52, wherein the first money pool template is activated by a user.

54. The method of claim 52, further comprising collecting a fee for the searching of the pool system network.

55. The method of claim 52, further comprising receiving input parameters from a user that determine search parameters associated with the searching of the local money pool system network.

56. The method of claim 46, further comprising searching the local money pool system network for a desired pool.

57. The method of claim 46, wherein the local money pool system network provides access to the first local money pool system.

* * * * *